(12) United States Patent
Barker et al.

(10) Patent No.: US 11,422,529 B1
(45) Date of Patent: *Aug. 23, 2022

(54) MONITORING SYSTEM FOR USE IN INDUSTRIAL OPERATIONS

(71) Applicants: Ricky Dale Barker, Frankfort, KY (US); Clay Thomas Marshall, Frankfort, KY (US)

(72) Inventors: Ricky Dale Barker, Frankfort, KY (US); Clay Thomas Marshall, Frankfort, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/230,119

(22) Filed: Apr. 14, 2021

Related U.S. Application Data

(62) Division of application No. 16/005,814, filed on Jun. 12, 2018, now Pat. No. 11,016,468.

(51) Int. Cl.
| | |
|---|---|
| *G05B 19/4065* | (2006.01) |
| *G05B 19/406* | (2006.01) |
| *G07C 3/00* | (2006.01) |
| *G07C 3/08* | (2006.01) |

(52) U.S. Cl.
CPC ....... *G05B 19/4065* (2013.01); *G05B 19/406* (2013.01); *G07C 3/005* (2013.01); *G07C 3/08* (2013.01); *G05B 2219/31123* (2013.01); *G05B 2219/31265* (2013.01); *G05B 2219/31438* (2013.01)

(58) Field of Classification Search
CPC ...... G05B 19/4065; G05B 2219/31438; G05B 2219/31123; G05B 2219/31265
USPC ......................................................... 700/175
See application file for complete search history.

(56) References Cited

U.S. PATENT DOCUMENTS

| | | | |
|---|---|---|---|
| 7,533,798 B2 | 5/2009 | Jones et al. | |
| 9,892,744 B1 | 2/2018 | Salonidis et al. | |
| 2003/0061857 A1 | 4/2003 | Keller | |
| 2007/0188117 A1 | 8/2007 | Shoda et al. | |
| 2009/0243647 A1 | 10/2009 | Chari | |
| 2009/0271006 A1 | 10/2009 | Jordan et al. | |
| 2011/0231169 A1* | 9/2011 | Furem | E02F 9/2054 703/2 |
| 2012/0232701 A1 | 9/2012 | Carty | |
| 2016/0282231 A1 | 9/2016 | Keene et al. | |
| 2017/0153625 A1* | 6/2017 | Yamamoto | G05B 19/4063 |
| 2017/0192414 A1* | 7/2017 | Mukkamala | H04L 63/0876 |

* cited by examiner

*Primary Examiner* — Jigneshkumar C Patel
(74) *Attorney, Agent, or Firm* — Mark F. Smith; Smith Brandenburg Ltd

(57) ABSTRACT

A monitoring system for an industrial operation having one or more machines, the monitoring system operates to obtain operational information comprising performance operating parameters and uses the operational information to create an operational baseline and reference thresholds and monitors real-time operational data to determine if an operating parameter exceeds a reference threshold.

16 Claims, 14 Drawing Sheets

MONITORING SYSTEM FOR USE IN INDUSTRIAL OPERATIONS

CROSS-REFERENCE TO PRIOR APPLICATION

This is a divisional application of and claims benefit of U.S. patent application Ser. No. 16/005,814 filed Jun. 12, 2018, titled: Monitoring System For Use In Industrial Operations.

BACKGROUND OF THE INVENTION

The subject invention is a monitoring system for use in industrial operations and more particularly, a monitoring system for use in industrial operations that learns the normal operating state of industrial machines and detects any changes in their operating state.

Machines used in industrial operations usually have a plurality of moving parts and/or electrically operated devices. Many such machines have sensors and other monitoring systems that are integrated within critical areas for monitoring operating conditions and machine performance. In the event that the monitoring system identifies that the performance of the machine is degrading or that a potential problem is developing, the monitoring system will perform a predetermined operation, such as sending a warning to a master controller or operates to stop the operation of the machine or the industrial operation.

Unfortunately, many machines used in industrial operations do not have integrated monitoring systems or have monitoring systems with limited monitoring capabilities. In addition, machines such as used in robotic assembly systems or manufacturing operations are often located in close proximity to each other. Such close proximity makes it difficult for operators to detect problems, such as by hearing sounds not normally associated with normal operation of the machine. Accordingly, problems often remain unnoticed until they reach a critical condition that may result in expensive repairs or suspending operations until repairs can be made.

Monitoring systems have also been developed for use in manufacturing operations that include a plurality of sensors that are placed within or on a machine that communicate, such as through wireless communication, to a processor that operates to receive operational data from the sensors for monitoring the operation of the machine. In some systems, the processor compares the operational data to predefined estimated data for the machine to determine if maintenance is required or will be required for the machine. One such monitoring system is shown and described in U.S. Pat. No. 7,533,798 for a data acquisition and processing system for risk assessment. As described therein an industrial system for monitoring and analyzing industrial operations comprises one or more machines each having sensors that operate to obtain data related to the operation of the machines. Data is transferred to a risk assessment component that operates to select all or portions of the data and makes a comparison of the data to predefined (i.e. assumed) data that is defined to reflect the proper machine condition. Using the comparison, the risk assessment component determines if the one or more machines are properly performing within operating specifications (with acceptable risk assessment parameters) and/or if the one or more machines are predicted to fail within a predefined time segment. The risk assessment component further operates to transmit a warning if the one or more machines are not performing within operating specifications and/or if one or more machines are predicted to fail within a predefined time segment.

While such monitoring systems operate to monitor changes in a machine's operating condition and determines if such changes falls outside the predetermined (assumed) operating parameters suggest that maintenance needs to be performed, they do not use the machine's typical operating condition or parameters to create a baseline of operation for that machine which is used to determine if a machine's operation has changes enough to require maintenance. Thus, a machine may be operating properly and will continue to operate properly while one or more of its operating parameters may fall outside assumed proper operating levels. Further, such systems do not operate to take into account outside environmental conditions that may influence a assumed operating parameter and are unable to determine and make recommendations as to the optimal time to perform such maintenance or to determine when maintenance is scheduled such that it minimizes disruption in the overall industrial operations. For example, such monitoring systems fail to make recommendations as to rescheduling the operation of an industrial operation to permit maintenance to be performed or modifying a maintenance schedule to schedule maintenance to be performed that minimizes disruption to the overall industrial operation.

Accordingly, it would be desirable for a monitoring system that can be used to monitor an industrial operation having or a plurality of different apparatus and machines, that utilizes different types of information and data to optimize maintenance scheduling to minimize disruption of an industrial operation, which is relatively inexpensive and easy to implement; that can be connected to various machines for monitoring the performance and operating condition of the machine.

SUMMARY OF THE INVENTION

The subject invention is a monitoring system for use in industrial operations that operates to learn the normal operating state of a machine and detects any changes in the operating state. The monitoring system preferably includes one or more apparatus sensor arrays having one or more sensors placed in one or more locations on or within one or more individual machines which collect operational data during the normal operation state of a machine, a communication system for transmitting the collected data to a data analyzer system that operates to establish an operational baseline (based on the normal operating state) of each machine and one or more reference thresholds. During operation of a machine, the one or more sensors of the sensor array transmits real-time operational data through the communication system to the data analyzer system which operates to compare the real-time operational data to the one or more reference thresholds and if the real-time operational data falls outside one or more of the reference thresholds, the data analyzer system operates to display and/or transmits a warning to an output device for informing an operator.

Preferably the one or more sensor arrays include one or more vibration sensors that function to obtain real-time operational data in the form of vibrational levels at one or more locations on and/or within the machine.

Preferably the one or more sensor arrays include one or more temperature sensors that function to obtain real-time operational data in the form of temperature levels at one or more locations on and/or within the machine.

Preferably the one or more sensor arrays include one or more acoustic sensors that function to obtain real-time operational data in the form of acoustic levels at one or more locations on/and or within the machine.

Preferably the one or more sensor arrays include one or more electrical sensors that function to obtain real-time operational data in the form of electrical levels at one or more locations on/and or within the machine.

The monitoring system of the subject invention includes an analysis module that operates to receive operational data and creates historical data for each machine and makes a recommendation based on additional operational data and the historical data.

The monitoring system of the subject invention includes an analysis module that operates to use maintenance schedules, operational data and historical data to make a recommendation.

The monitoring system of the subject invention includes an analysis module that operates to receive scheduling information and uses the scheduling information, operational data and historical data to make a recommendation.

The monitoring system of the subject invention includes an analysis module that operates to receive operational data and historic data for each machine and creates a prioritized listing of recommendations using the historical data and operational data.

In a preferred embodiment of the invention, the monitoring system operates to monitor an industrial operation having more than one machines, the monitoring system includes a sensor array for each more than one machines, each sensor array has one or more sensors placed in one or more locations on or within each machine which collects real-time operational data, a communication system for transmitting the real-time operational data to a data analyzer system that operates to establish an operational baseline (the normal operating state) of the machine and to create historical data and uses the historical data to determine reference thresholds. The one or more sensors of the sensor array for each machine operate to transmit real-time operational data through the communication system to the data analyzer system which operates to compare the real-time operational data to the reference thresholds and if the real-time operational data falls outside one or more of the reference thresholds, the data analyzer system operates to display and/or transmit a warning to an output device for informing an operator.

Preferably, the data analyzer system operates to compare operational data to reference thresholds and if the operational data falls outside one or more of the reference thresholds by a predetermined level, the data analyzer system operates to display and transmit a warning and preferably functions to stop the operation of the machine.

Preferably, the data analyzer system operates to create a predicted time-to-fail machine listing for the industrial operation using sensor operational data for a machine.

Preferably, the data analyzer system operates to create a prioritize listing for the industrial operation based on the predicted time-to-fail machine listing and uses the prioritize listing and scheduling information to determine the optimum time for performing maintenance on one or more machines in the industrial operation.

In a preferred embodiment of the invention, historical data comprises performance operating levels for various operating parameters collected during a defined period of time for the machine being monitored.

In a preferred embodiment of the invention, historical data comprises operational data taken during the normal operational state of the machine being monitored whereby the operational data is used to create an operational baseline (historically normal operation) of the machine.

In a preferred embodiment of the invention, the operational baseline utilizes operational specifications for the machine.

In a preferred embodiment of the invention, historical data comprises operational data collected from a plurality of similar or identical machines over a defined period of time.

In a preferred embodiment of the invention, operational data includes environmental data.

In a preferred embodiment of the invention, operational data incudes time dependent operational data.

In a preferred embodiment of the invention, the data analyzer system functions to calculate and display a predictive determination for a machine.

In another preferred embodiment of the invention the monitoring system is utilized on independently operating machines for monitoring the operating state of the machine.

In a preferred embodiment of the invention the independently operating machine is a consumer product machine.

In a preferred embodiment of the invention the independently operating machine includes a control system that communicates with and cooperates with the monitoring system for controlling the operation of the independently operating machine.

These and other features, aspects, and advantages of the present invention will become better understood with regard to the following description, appended claims, and accompanying drawings.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
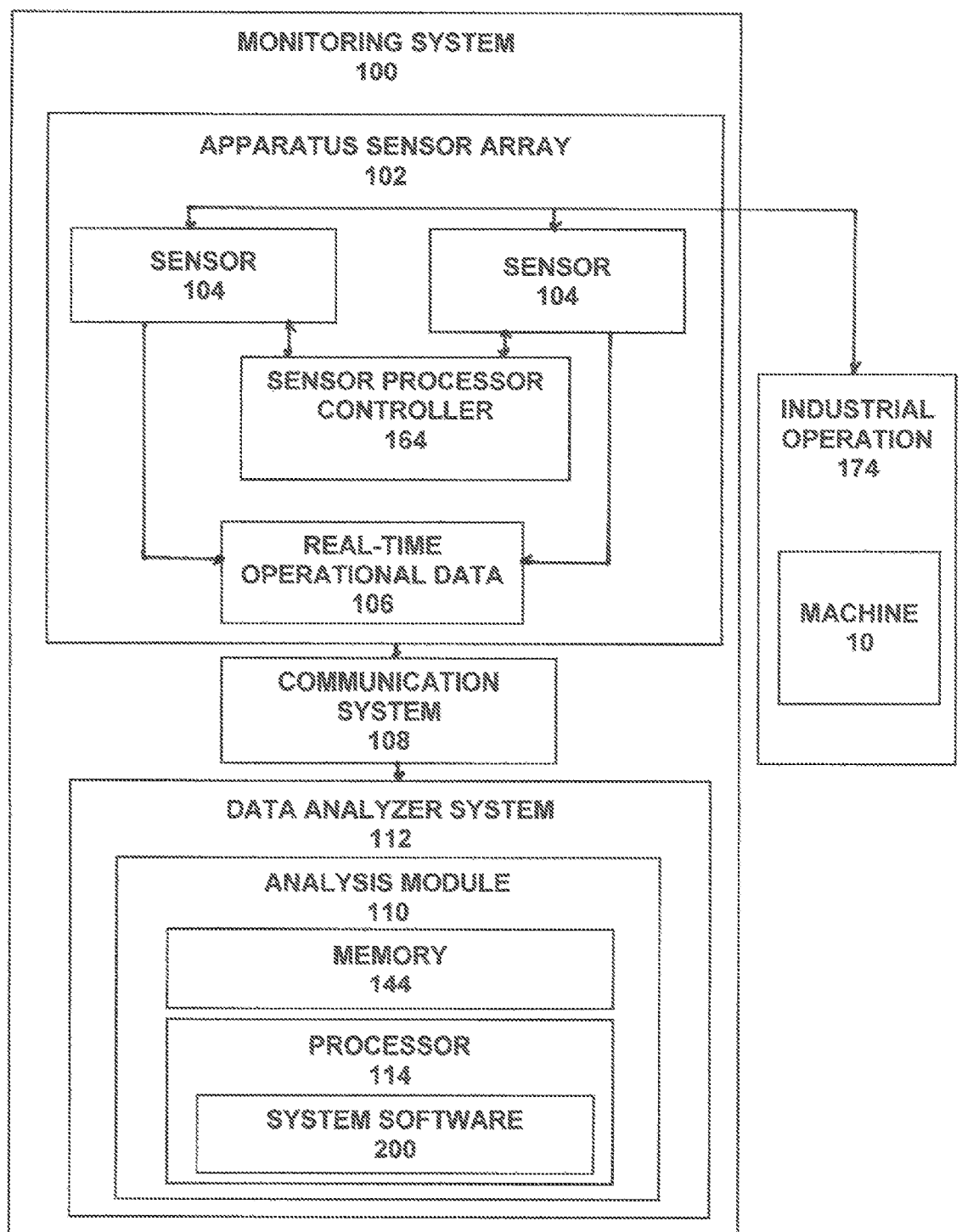
FIG. 1 is a schematic illustration of the monitoring system for use in industrial operations having an apparatus sensor array with one or more sensors placed in one or more locations on or within a machine which collects real-time operational data, a communication system for transmitting the real-time data to a processor that operates to establish an operational baseline for the machine.

The subject invention is a monitoring system for use in industrial operations that learns the normal operating state of an industrial machine and detects any changes in the operating state. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. It should be understood that the terms "machine" or "machines" as used herein includes various types of machines and apparatus such as, but not limited to, those used for manufacturing, assembly, transporting and the monitoring of objects or operations, including machines used in assembly line systems. It should also be understood that the terms "machine" or "machines" as used herein can include one or more apparatus that operate independently or together to perform a function in an industrial operation. A machine or machines can also include a series of machines operating together, such as in a production, manufacturing or assembly working together or working independently at a location. Further, a machine or machines may include moving and non-moving components, rotating components, reciprocating components and/or electrical components working together or independently. As used herein the term "industrial operation" includes manufacturing operations, assembly operations, transporting operations, and production operations having a plurality of machines, such as an assembly line, a production line, a transportation line (conveyor line), a manufacturing line, a packaging line, and the like. As used herein the term "master controller" refers to a control system such as a proportional-integral-derivative control system (PID), a distributed control system (DCS) and programmable logic control system (PLC) and their functional successors (i.e. programmer automation controllers, PC based control, etc., etc.) that regulates, monitors and/or controls the operation of one or more machines operating in an industrial operation. As used herein the term "machine control system" refers to the individual machine control system that function to control the individual operation of a machine. It should be understood that the master controller and/or one or more of the individual machine control systems can be at the same physical location (i.e. same proximate factory floor or even built into the same processor (such as a chip having a different core)) or at different locations. As used herein, the term "software" refers to any form of programmed machine-readable language or instructions (e.g., object code) that, when loaded or otherwise installed, provides operating instructions to a machine control system capable of reading those instructions. It should be understood that the software of the present invention can be stored or reside on, as well as be loaded or installed from, one or more floppy disks, CD ROM disks, hard disks or any other form of suitable non-volatile electronic storage media. The software can also be installed by downloading or other form of remote transmission, such as by using Local or Wide Area Network (LAN or WAN)-based, Internet-based, web-based or other remote downloading or transmission methods. As used herein the term "historical data" refers to data for a particular machine that includes operational data when a machine is operating properly, such as within predefined specifications, or data obtained from one or more other machines identical of similar machines performing the same or similar functions and/or are operating in the same or similar environment which are operating properly, such as within pre-defined specifications as well as operational data taken when the machine's performance is degrading. As used herein the term "operational data" refers to performance operating levels for various operating parameters taken at a predefined point in time or over a predefined time segment. The term "real-time operational data" refers to operating data being obtained and monitored by the monitoring system as the machine operates and is used to determine the current status ("health") of the machine at the particular point in time.

Figure 2:
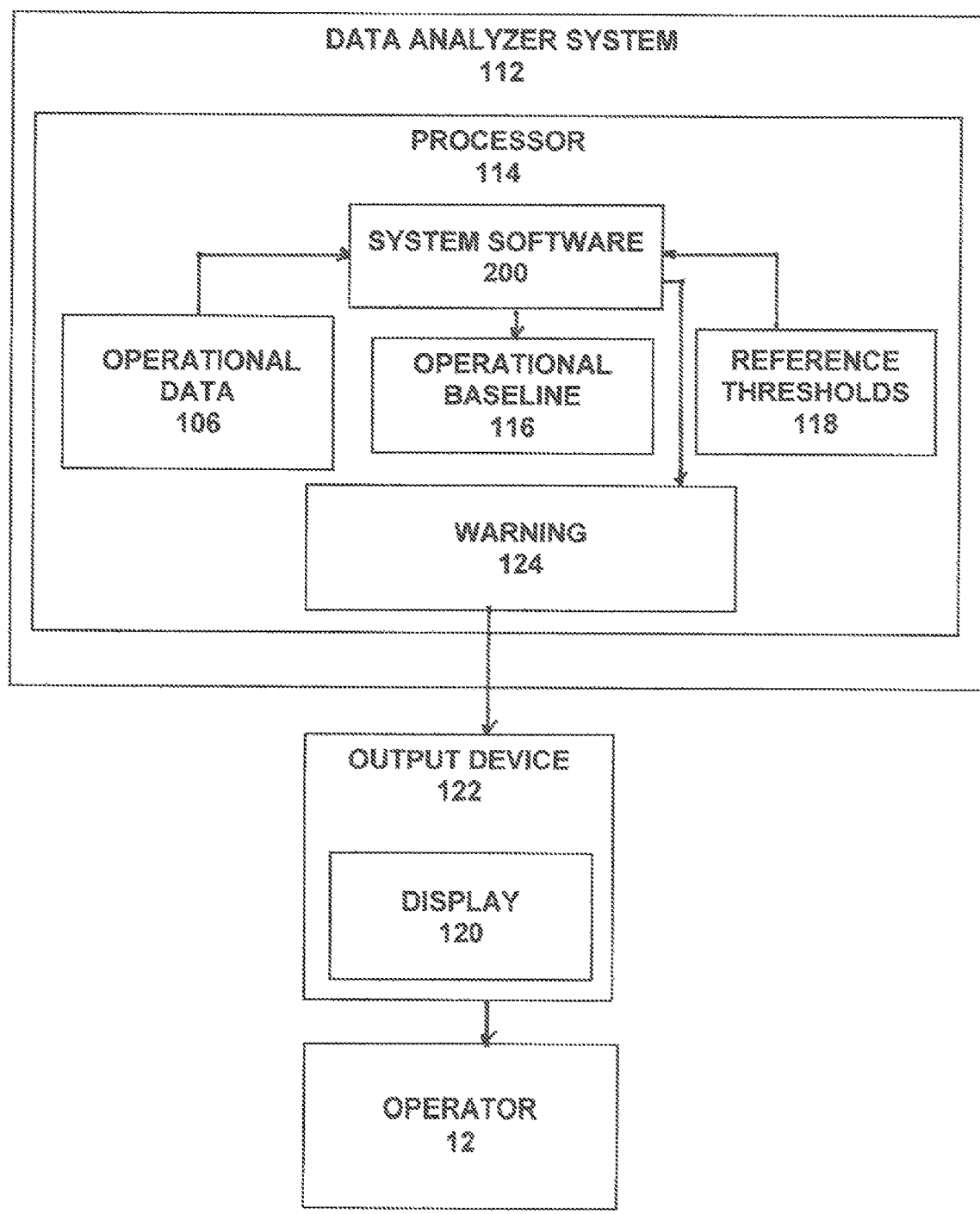
FIG. 2 is a schematic illustration of the data analyzer system of the monitoring system having a processor for receiving real-time operational data and comparing the real-time operational data to one or more reference thresholds and if the real-time operational data exceeds one or more reference thresholds, the data analyzer system operates to send a warning to an output device for display or for transmitting an alarm for an operator.

Monitoring System:

As illustrated in FIGS. 1 and 2, the monitoring system 100 of the subject invention is shown and preferably includes an apparatus sensor array 102 having one or more sensors 104 placed in one or more locations on or within a machine 10 of an industrial operation which function to collect operational data 106, a communication system 108 for transmitting the operational data 106 to an analysis module 110 of data analyzer system 112 having a processor 114 that operates to establish ("learn") the normal operating state of the machine and uses the collected operational data taken during the normal operating state of the machine to create an operational baseline 116 for a particular machine 10. It should be understood that as used herein the terms "normal operating state" or "normal operation" or "normal operating levels" refer to the operation of the machine (or an industrial operation) when it is performing its function properly and when the machine (or an industrial operation) and the components of the machine (or the machines in an industrial operation) are operating at their peak efficiency and not needing and would not perform better with maintenance. During operation of the machine 10, the one or more sensors 104 of the sensor array 102 transmits real-time operational data 106 through the communication system 108 to the data analyzer system 112 which operates to use the operational data 106 to create reference thresholds 118 (FIG. 2) such that during continued operation of the machine if real-time operational data 106 falls outside one or more of the created reference thresholds 118, the data analyzer system 112 creates a display 120 on an output device 122 a warning 124 that informs an operator 12 of a future or current need for maintenance or servicing of the machine 10.

Figure 3:
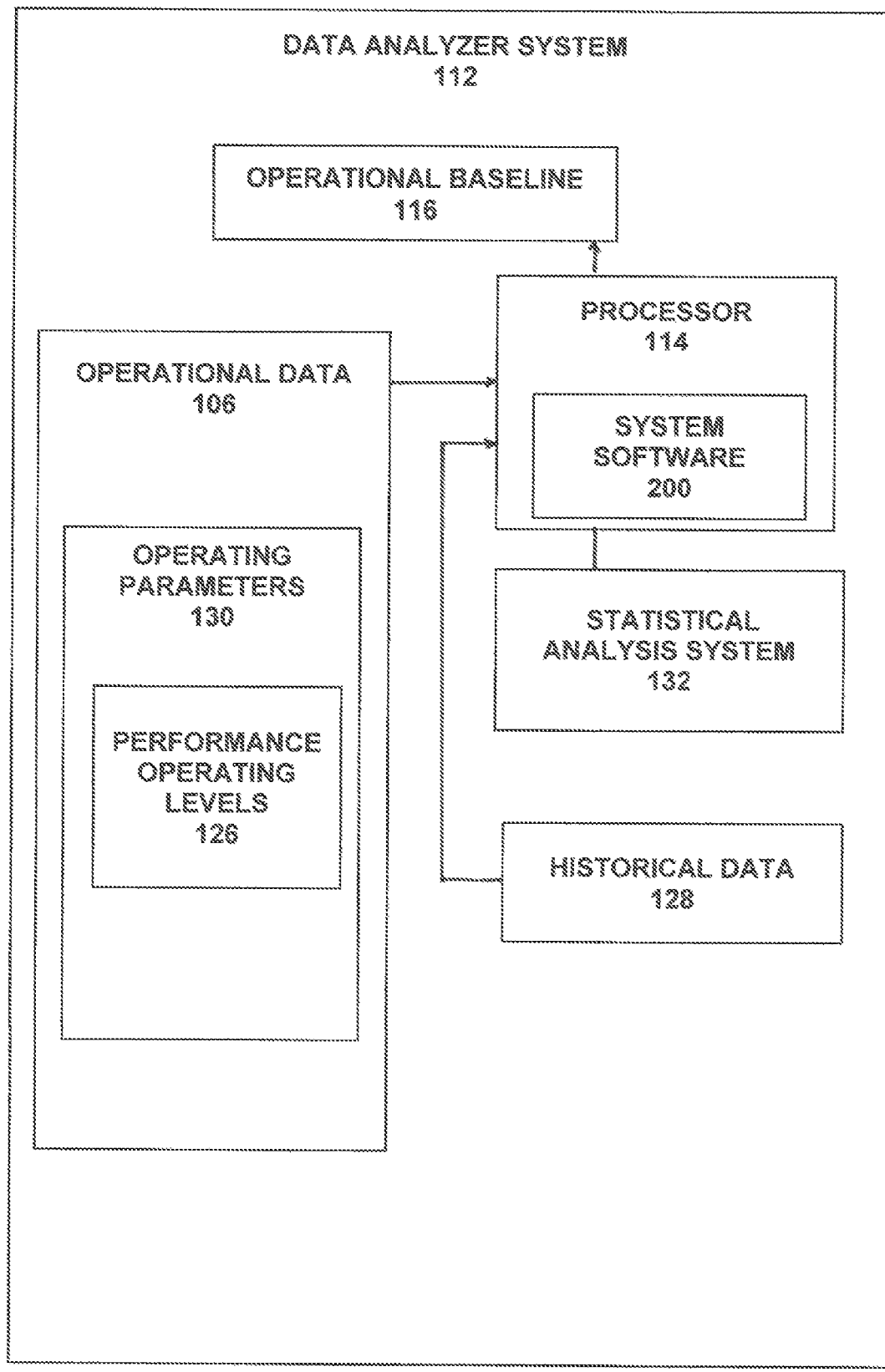
FIG. 3 is a schematic illustration of the analysis module having a conventional statistical system for using operational data taken during the normal operational state of the machine to create an operational baseline.

As illustrated in FIG. 3, in determining the operational baseline 116 for a machine 10, the analysis module 110 of the data analyzer system 112 functions to perform a predictive analysis using operational data 106 taken during the normal operating state of the machine and identifies recurring performance operating levels 126 (normal operating levels) creating historical data 128 for various operating parameters 130 and uses conventional statistical analysis system 132 to develop the operational baseline 116 for the machine 10.

Figure 4:
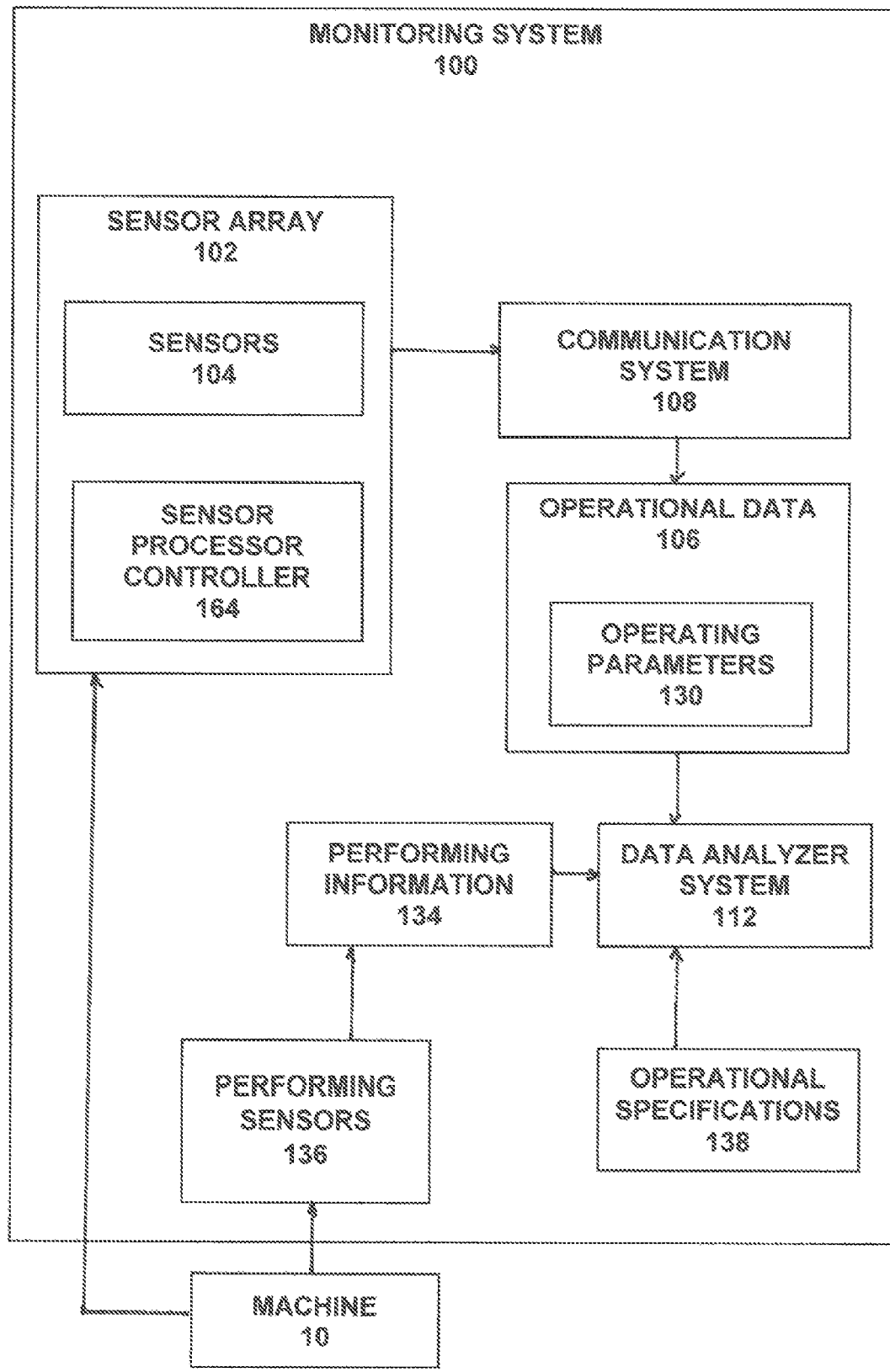
FIG. 4 is a schematic illustration of the monitoring system of the subject invention comprising a sensor array for transmitting real-time operational data using a communication system and a data analyzer system that uses operational data taken during the normal operational state of a machine, performance information obtained from performance sensors and operational specifications to create a operational baseline.
Figure 5:
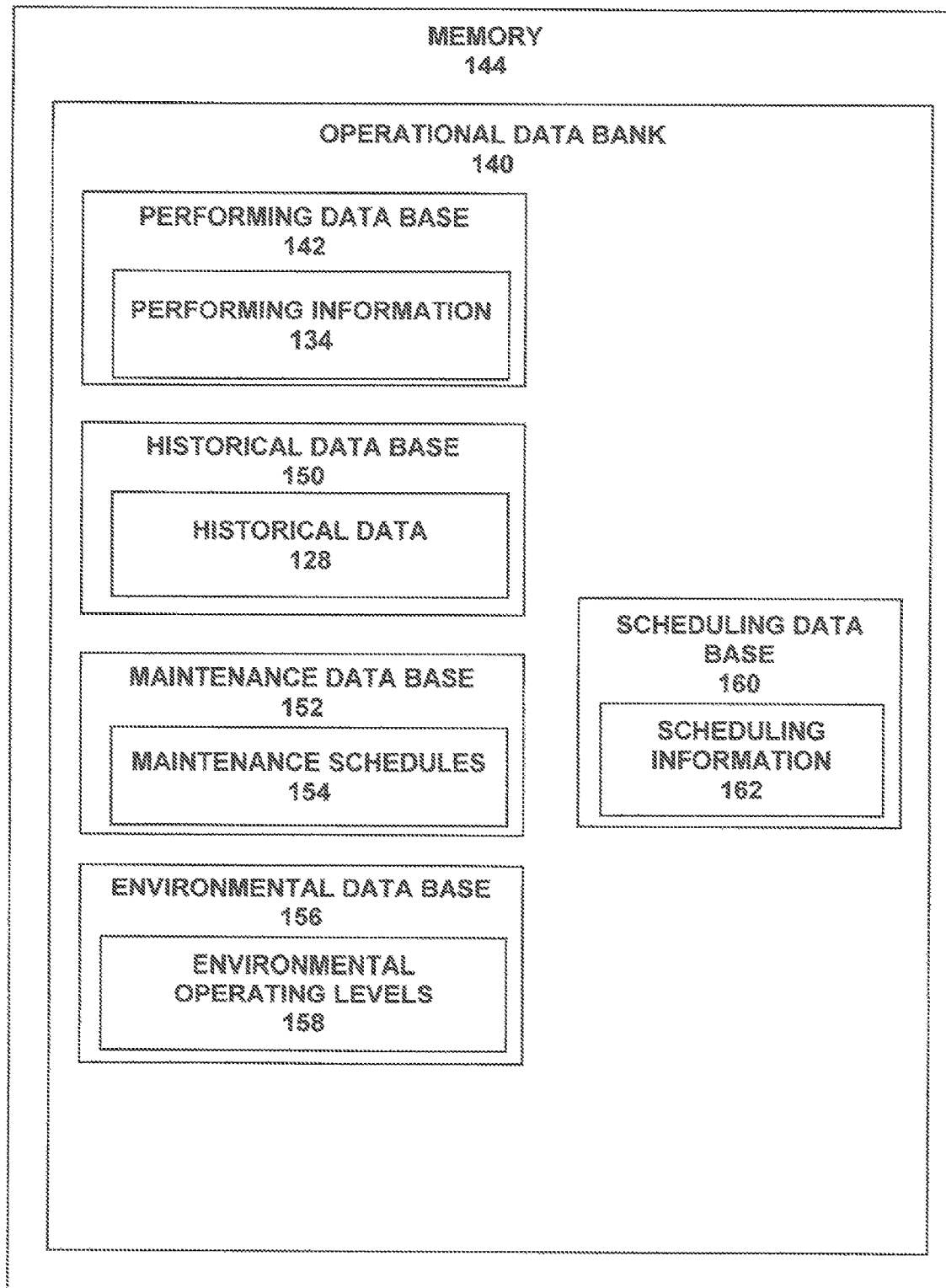
FIG. 5 is a schematic illustration of the memory of the monitoring system showing an operational data bank having a performance data base, a historical data base, a maintenance data base, an environmental data base, a performance data base and a scheduling data base.
Figure 6:
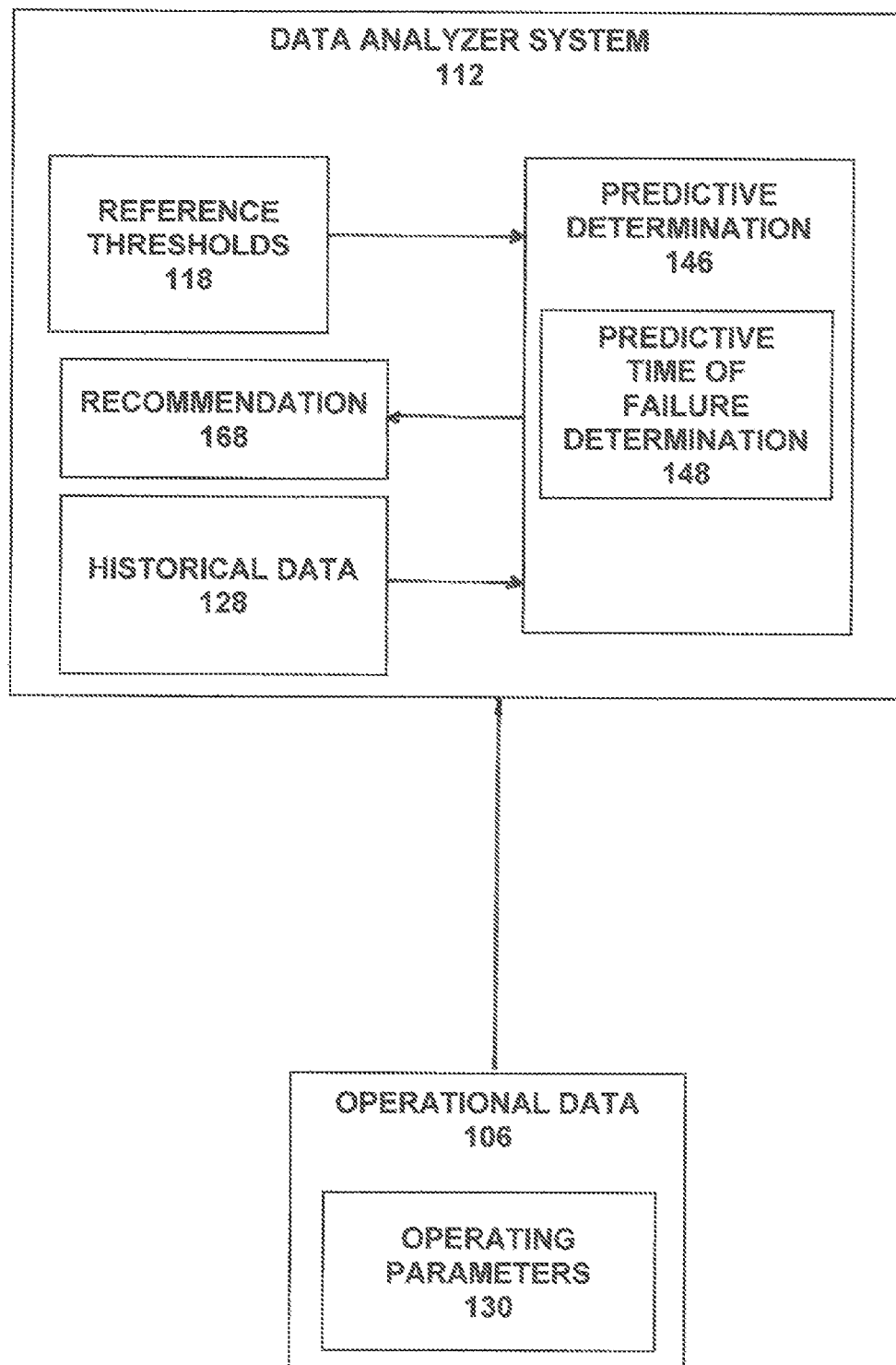
FIG. 6 is a schematic illustration showing the data analyzer system that operates to use historical data and real-time operational data to compare to reference thresholds and creating a predictive determination and a recommendation.

The one or more sensors 104 of the apparatus sensor array 102 operate to collect various types of operational data 106, including specific performance operating levels 126 for various operating parameters 130 of a machine 10 (FIG. 4). The various operating levels include those parameters that indicate the operational status of a machine and may comprise, but are not limited to, vibration levels, temperature levels, pressure levels, acoustic levels, electrical levels, resistance levels, stress-strain levels and other performance operating levels that can be used to indicate the current operating condition and/or status of a machine. For a non-limiting example, vibration levels can be obtained using an accelerometer to determine the internal vibration levels of the machine. The true frequency of the machine can be calculated by sampling at a rate of at least two times the expected maximum frequency. In another non-limiting illustration, the temperature within a machine or of a machine component during operation can be measured using a thermometer. In another non-limiting illustration, the current and/or voltage being utilized can be obtained by a current transformer or voltage meter. As illustrated, performing information 134 is also obtained, utilizing performing sensors, regulators, monitors, and the like or by other inputs (collectively referred to as "performing sensors") 136 is used by the data analyzer system 112 when a machine 10 is performing its function properly, such as within manufacturing and operational specifications 138. As illustrated in FIG. 5, such performing information 134 is stored in an operational data bank 140 as a performing data base 142 in a memory 144 of the analysis module 110. As illustrated in FIG. 3, the data analyzer system 112 then operates to create historical data 128 using performance operating levels 126 of various operating parameters 130 taken during the normal operating state of the machine and performing information 134 in creating an operational baseline 116. For a non-limiting example, performing information is obtained during operation of a machine such that parts processed by or manufactured by the machine are analyzed to determine the percentage of parts that are made during the proper operation of the machine, such as in this non-limiting example when the machine is operating within its predetermined operational specifications. In another non-limiting example performing information of a machine, such as an assembly line, is analyzed to determine the amount of output produced by the assembly line during proper operation (normal operating state) of the assembly line (industrial operation). It should be understood that in a preferred embodiment the performing information can be collected such as by use of performing sensors that in a non-limiting example operate to measure the amount of output produced in a predetermined amount of time, or it can comprise operational specifications such as the amount of output that a machine was designed to provide. It should be understood that in a preferred embodiment performing information for a machine can also be obtained by obtaining performing information from multiples of the same or nearly the same machines performing the same or similar functions and determining average performing levels that are then used in creating an operational baseline. In another preferred embodiment historical data, such as performing operating levels and performance levels taken during the normal operating state of a machine or an industrial operation, is used in creating an operational baseline and reference thresholds (which preferably can also be inputted manually using the output device by the operator). As illustrated in FIG. 6, the data analyzer system 112 further operates to monitor real-time operational data 106 and comparing it to reference thresholds to determine if the real-time operational data approaches or exceeds one or more of the reference thresholds 118 and if so, operates to create a predictive determination 146 that includes a predictive time of failure determination 148 as to when maintenance on a machine must be performed to prevent failure. For a non-limiting exemplary illustration, historical data showing that when a temperature level reading on a machine begins to show an increase over time, it indicates that a bearing on a gear in a machine is beginning to fail. By determining this temperature level increase is statistically predictive, the analysis module operates to monitor real-time operational data and identify any such temperature increase and creates a predictive determination that a machine (or a component therein) is showing signs of failure and provides a warning and a predictive time of failure determination to an operator that the machine may be experiencing a near future bearing failure thus helping to identify the specific maintenance required. Accordingly, maintenance can be performed on the machine prior to such failure.

As shown in FIG. 5, memory 144 of the analysis module 110 includes an operational data bank 140 having a historical data base 150 comprising historical data 128, a maintenance data base 152 comprising maintenance schedules 154, an environmental data base 156 having environmental operating levels 158 for a machine 10, a performing data base 142 having performing information 134, and a scheduling data base 160 having scheduling information 162 (such as work orders, production plans, scheduling of an industrial operation, scheduling of one or more other industrial operations forming similar operations, and the like). Processor 114 (FIG. 2) of the data analyzer system 112 operates using system software 200 to perform the specific data analysis function as described herein and can comprise various computing hardware such as central processing units (CPU's), graphics processing units (GPU's), digital signal processors (DSP's), microprocessors, field programmable gate arrays (FPGA's), very large scale integration (VLSI) systems, complex programmable logic devices (CPLD's), or systems on a chip (SOC's), and/or other such data processing devices including cell processors and quantum computing devices. Preferably, the processor 114 operates under the control of an operating system, such as the WINDOWS operating system developed by Microsoft Corporation or the MACINTOSH operating system developed by Apple Computer Corporation. It should be understood, however, that other operating systems could be utilized to implement system software 200 of the data analyzer system 112 that operates in cooperation with the memory 144 and the statistical analysis system 132 to analyze the operational data 106 with historical data 128 to make a predictive determination 146. The data analyzer system 112 further comprises other devices, such as a suitable input device, like a keypad, touch screen, or any other suitable input device that can accept information; and one or more suitable output devices, such as a computer display, printer, image-forming or display device, and the like. It should be understood that the data analyzer system 112 can include any combination of the above components, or any number of different components, peripherals, and other devices. It should be understood that the memory 144 can be in the form of any of the usual devices used for the storage of data, such as computer hard drives, floppy discs, binary codes, optical bits, mechanical scribes, magnetic tapes, compact discs, digital audio tapes, analog tapes, vinyl discs, and any device or devices capable of storing data.

Preferably, as illustrated in FIG. 1, each sensor 104 of an apparatus sensor array 102 is connected to a sensor processor controller 164 which receives real-time operational data 106 from each sensor 104 and is coupled to and communicates with the analysis module 110 of the data analyzer system 112 through the communication system 108, which can be in the form of electrical wires or other electrically conducting fibers or circuits, optical fibers, or any other wired or wireless data transmitting systems capable of transmitting data, such as but not limited to the Internet, local area networks (LAN), wide area networks (WAN), to transmit the real-time operational data 106 to the data analyzer system 112.

Baseline Operation:

In a preferred embodiment, as illustrated in FIGS. 1, 2 and 5, one or more sensor arrays 102 are positioned on and/or in one or more machines 10 such that sensors 104 are positioned along critical areas of a machines 10 for obtaining performance operating levels 126 of various operating parameters 130 and transmits the real-time operational data 106 to the sensor processor 164 which operates to collect and transmit the real-time operational data 106 using the communication system 108 to the data analyzer system 112 for storage in the operational data bank 140 of the memory 144. It should be understood that operational data 106 is first obtained during the normal operating state of the one or more machines 10. It should be understood that in a preferred embodiment the normal operating state is when the machine is performing its function properly and is further operating within predefined operational specifications 138 (FIG. 4) and prior to any maintenance being indicated or required for any of the one or more machines 10. The operational data 106 is then identified and saved in the historical data base 150 as historical data 128. After a sufficient amount of operational data 106 has been identified and saved, the data analyzer system 112, using system software 200 and the statistical analysis system 132 operated by the processor 114, creates an operational baseline 116 for the machine 10. The operational baseline 116 is a representation of the normal operating state of a machine and includes performance operating levels 126 of various operating parameters 130 for the machine 10, such as but not limited to normal, vibration levels, temperature levels, pressure levels, acoustic levels, electrical levels, resistance levels, stress-strain levels and other operational parameters taken during the normal operation of the machine. For a non-limiting exemplary illustration, the temperature level for a machine (or a machine component) can be between 90° F. and 92° F. Thus, the operational baseline for a machine may include an operational temperature level of 90-92° F. It should be understood that this "learning" process of the monitoring system for creating an operational baseline for the normal operating state of a machine preferably requires at least two learning cycles. For an illustrative example, in establishing the normal operating state of a machine the performance of the machine can be rated, such as given a performance rating of 1-5, whereby 1 indicating that the machine is performing at its optimal performance level and 5 indicating the machine is operating at an unacceptable performance level. Depending on the performance rating the data analyzer system operates to continuously update the operational baseline until operational baseline reflects the normal performance operating levels of the machine when the machine is operating properly, and no maintenance is indicated.

Maintenance Prediction

Figure 7:
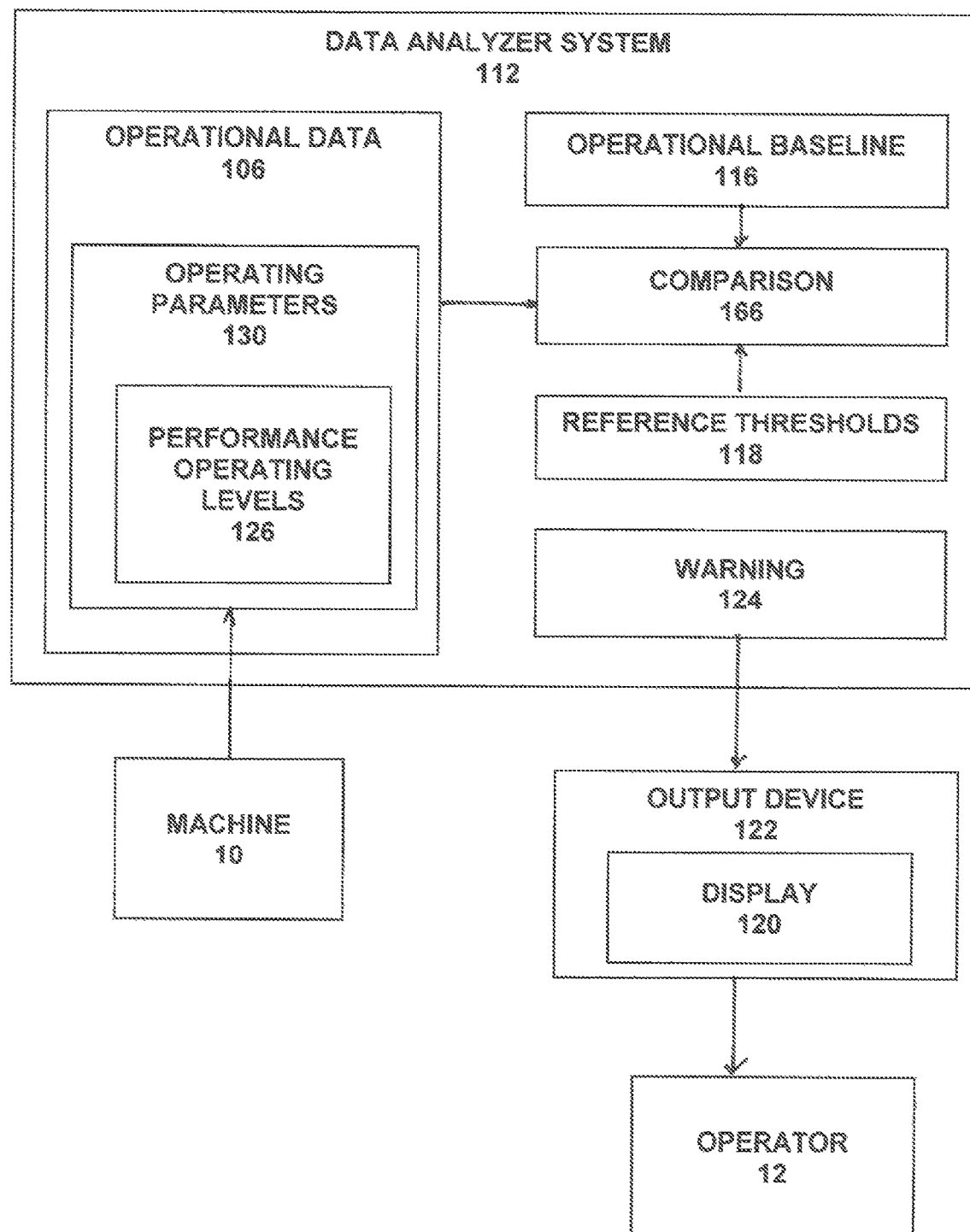
FIG. 7 is a schematic illustration showing the data analyzer system of the monitoring system for making a comparison of operating parameters to an operational baseline and reference thresholds and for transmitting a warning to an output device to an operator.

As illustrated in FIGS. 2, 6 and 7 the operational data 106 includes various operating parameters 130 and the data analyzer system 112 operates such that a comparison 166 of the various operating parameters 130 of real-time operational data 106 from a machine 10 is made with respect to the operational baseline 116 for the machine 10. In the event the performance operating levels 126 for the various operating parameters 130 obtained from real-time operational data 106 approach or fall outside predetermined reference thresholds 118, a warning 124 is issued prior to failure of the machine 10. The warning 124 is preferably in the form of signal or sound which is generated and transmitted to an operator 12 or in the form of a display 120 on the output device 122, such as a human-machine interface, that the machine 10 is near failure, requires servicing, or is not performing properly. In another preferred embodiment, if the performance operating levels of the real-time operating data exceeds the thresholds the data analyzer system can send a signal to the master controller of the industrial operation to stop operating until maintenance is performed thereby reducing the risk of a catastrophic failure. In a preferred embodiment, the reference thresholds 118 for the various performance operating levels 126 are weighted and a recommendation 168 is generated and transmitted to the output device 122 concerning the servicing or maintenance of the machine 10.

Figure 8:
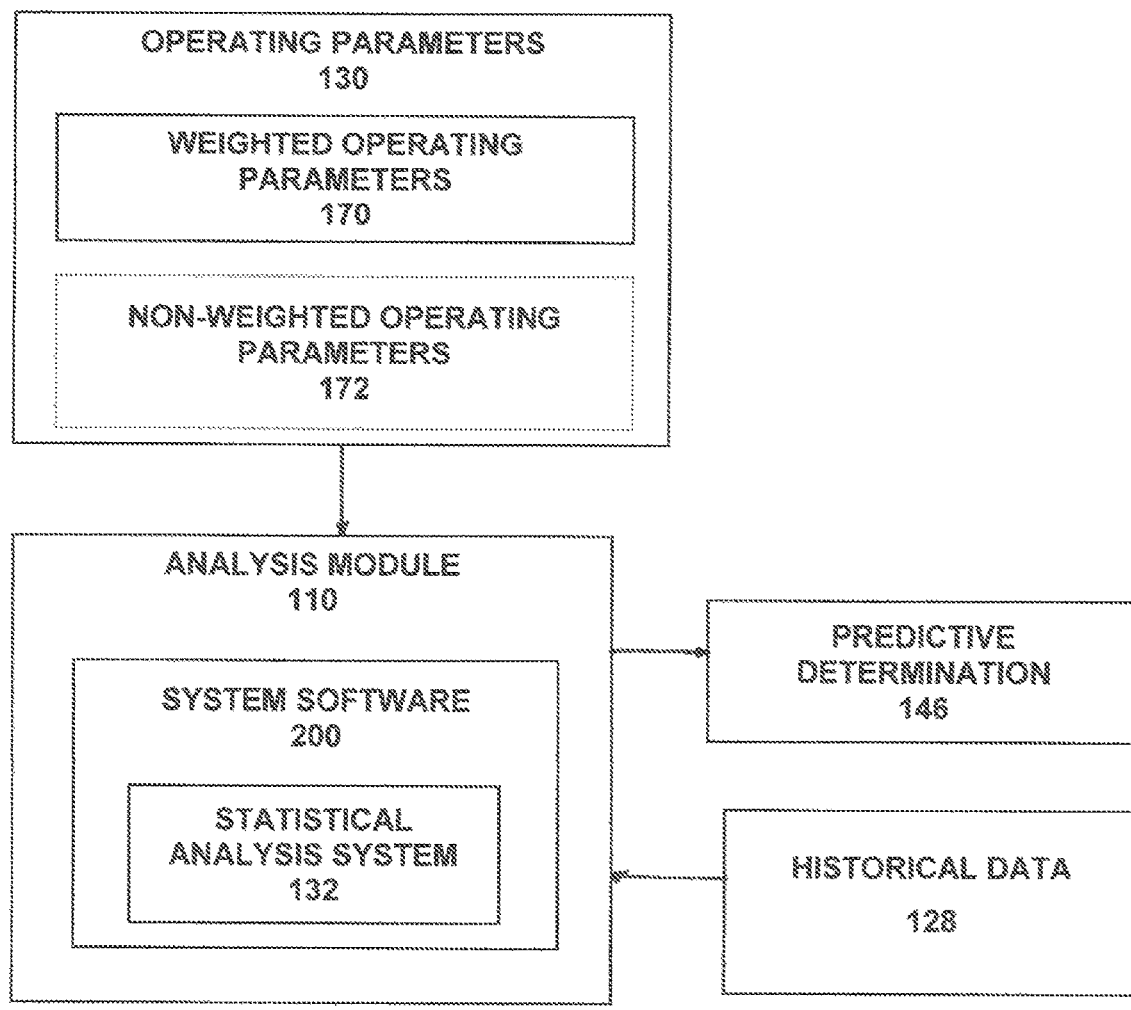
FIG. 8 is a schematic illustration showing weighted and non-weighted performance operating levels being transmitted to an analysis module to make a predictive determination.

Referring to FIGS. 1, 3 and 6, and as described above, the sensors 104 operate to measure various performance operating levels 126 of a machine 10. The analysis module 110 functions by utilizing system software 200 that cooperates with the statistical analysis system 132 to determine and make a predictive determination 146, such as a predictive time of failure determination 148, and/or a recommendation 168 (such as providing the necessary maintenance information). For an illustrative example the statistical analysis system 132 uses fuzzy logic and performance operating levels 126 and depending on the type of machine or operation of the machine or the location of the sensor 104 measuring and obtaining operational data 106 including performance operating levels 126 of one or more operating parameters 130, the specific operating parameters 130 can be weighted or non-weighted 170 and 172, respectively (FIG. 8). For a non-limiting example, if the sensor 104 measures temperature in an electronic control or master controller of a machine and the amount of weigh given to the operating parameter 130 may be greater than the vibration operating parameter 130 in making a predictive determination 146 (such as a predicted time of failure determination 148) that the machine is in need of maintenance of servicing or in making a prediction determination of the likelihood that the machine will need maintenance over a certain period of time or the possibility that the machine will fail if the machine continues to operate. It should be understood that performance operating parameters 130 can be non-weighted (each performance operating parameter being equal in significance—non-weighted performance operating parameter) or can be weighted (a performance operating parameter having less or more significance that other performance operating parameters). It should now be apparent to one skilled in the art that such determination as to weight can be determined using conventional fuzzy based on historical data 128 for the performance operating parameters 130. The analysis module 110 then operates to compute and display a predictive determination 146 based on the stored historical data 128 in accordance with the weighted/non-weighted performance operating parameters 170, 172. For a non-limiting example, performance operating parameters can be weighted such that for increases in temperature, greater than shown in the historical data is considered to be suspicious for decreasing performance or of the machine or indicating the need of immediate maintenance needs. It should also be understood that in a preferred embodiment the amount of weight given to a performance operating parameter can vary depending on the amount that the performance operating level for a performance operating parameter exceeds a reference threshold. For example, a performance operating parameter having a performance operating level that exceeds a reference threshold can be given a greater weight than a performance operating parameter having a performance operating level below a reference threshold. In addition, depending of the location of the sensor within or on a machine, a performance operating parameter, such as a vibration performance operating parameter, may be given a greater weight than a temperature performance operating parameter.

In general, depending on a comparison 166 of the real-time operational data 106 to historical data 128, the analysis module 110 further operates to determine and display a predictive determination 146, such as on the output device 122 of the data analyzer system 112. In non-limiting examples, the predictive determination 146 indicates that the machine can perform for an estimated amount of time before maintenance must be performed or that a machine may fail at any moment without maintenance. The predictive determination can also indicate that the machine should be able to complete its current operation or scheduled operation before requiring maintenance. It should also be understood that the predictive determination can also indicate the particular maintenance required, such as comparing the performance operating levels being obtained from a specific sensor or sensor array and comparing it to historical data stored in the historical data base to identify a probably cause for changes in the performance operating levels and the maintenance that is required. In a preferred embodiment, the analysis module further operates to make a recommendation 168 based on the real-time operational data 130 and historical data 128 such as illustrated in a non-limiting example to "immediately stop operation of a machine or to continue operation of the machine until performance operating levels reach certain levels." Accordingly, the subject invention operates to compare real-time operational data including performance operating levels for various operating parameters (weighted or non-weighted) to historical data and reference thresholds and makes a predictive determination as to the condition of the machine and determines a recommendation based on the predictive determination.

To further understand the operation of the analysis module 110, the following non-limiting exemplary illustration is provided. In a preferred embodiment of the invention, the monitoring system 100 operates whereby an apparatus sensor array 102 is placed in position on or within a machine 10 and includes one or more sensors 104 effective for obtaining real-time operational data 106 and transmits the collected real-time operational data 106 through the communication system 108 to the analysis module 110 of the data analyzer system 112 for storage in the operational data bank 140. Using operational data 106 obtained when the machine is performing properly and not requiring maintenance, the analysis module 110 operates to store performance operating levels 126 for various operating parameters 130 into a historical data base 150 as stored historical data 128. The analysis module 110 selects certain historical data 128 from the historical data base 150 that have a connection with determining an operational baseline 116 of the machine 10, such as when it is running or performing properly. Preferably, the analysis module 110, using the performance operating levels 126 for various operating parameters 130 of the selected historical data 128, further operates to determine if an operating parameter 130 should be weighted, and if so, determines the weight to be given to the selected operating parameter 130 and makes a comparison 166 of the performance operating level 126 for each selected operating parameter 130 with the same operating parameter of the historical data 128 to arrive at a predictive determination 146 of the machine 10 and preferably a recommendation 168. In a preferred embodiment of the invention, the analysis module 110 operates to generate a display 120 on the output device 122 including the predictive determination 146 and preferably a recommendation 168 as to the type of maintenance that should be performed on the machine 10. In this non-limiting example, the possible recommendation 168 is to "do nothing" or "continue the use of the machine." Another possible recommendation can include "immediate shutdown" or "to operate the machine for an additional amount of time" or "slow operation of the machine."

It should be understood that in a preferred embodiment that in creating a predictive determination, the type of machine, the location of the measurement, the operating environment of the machine, the importance of the operation of the machine or proper function of the machine, the estimated time of failure based on the operating level of the operating parameter, the type of failure assessed and condition being assessed and the importance that the operating parameter has in the operational performance of the machine is used and each parameter can be weighted or not weighted in creating the predictive determination and a recommendation.

It should also be understood that the system is not limited to fuzzy logic systems but that other logic systems such as Bayesian logic, artificial neural networks, and other like systems can also be used. Preferably, the data analysis software module can include or utilize commercially available statistical packages that can perform calculations/correlations/analysis/comparisons between two or more sets of data. It should be understood that these data could be digital, discrete, analog, or continuous. It should also be understood that the analysis module can also include or use unique/non-commercially available, proprietary formulae or flowcharts.

Predictive Analysis

The data analyzer system 112 further operates to create reference thresholds 118 for performance operating levels 126 for each operating parameter 130 that provides maximum acceptable changes in operational baseline 116 for the operation of each machine 10. For a non-limiting exemplary illustration, changes shown in performance operating levels 126, such as a change in vibration levels or temperature levels, are analyzed and correlated with changes in the performance information 134 for a machine 10 and used by the analysis module 110 of the data analyzer system 112 to predict or identify when a change in one or more performance operating levels 126 results in the performance of the machine falling outside acceptable predefined operational specifications 138. The data analyzer system 112 continues to operate to monitor the one or more machines 10 such that one or more apparatus sensor arrays 102 continues to transmit real-time operational data 106 collected by sensors 104 to the sensor processor controller 164 which operates to transmit the on-going real-time operational data 106 to the data analyzer system 112. The processor 114 of the analysis module 110 functions to compare the real-time operational data 106 to the reference thresholds 118 and determines if the real-time operational data 106 falls outside (exceeds) one or more of the reference thresholds 118. In the event that the real-time operational data 106 falls outside the one or more reference thresholds 118, the data analyzer system 112 further functions to transmit a warning 124, such as in the form of a display 120 to the output device 122, notifying an operator 12 that one or more machines 10 needs maintenance.

In another preferred embodiment of the invention the analysis module 110 operates to perform a mathematical analysis, such as a predictive analysis, by making a comparison 166 of the real-time operational data 106 for a particular machine 10 to historical data 128, such as historical data collected from one or more like machines prior to such a machine having a malfunction. The comparison 166 is then used to make a predictive determination 146 that predicts the probability of a machine 10 will malfunction during a predictive time of failure determination 148. Preferably, the data analyzer system 112 then transmits a warning 124 and/or transmits a recommendation 168 to the output device 122 prior to the error or malfunction.

Figure 9:
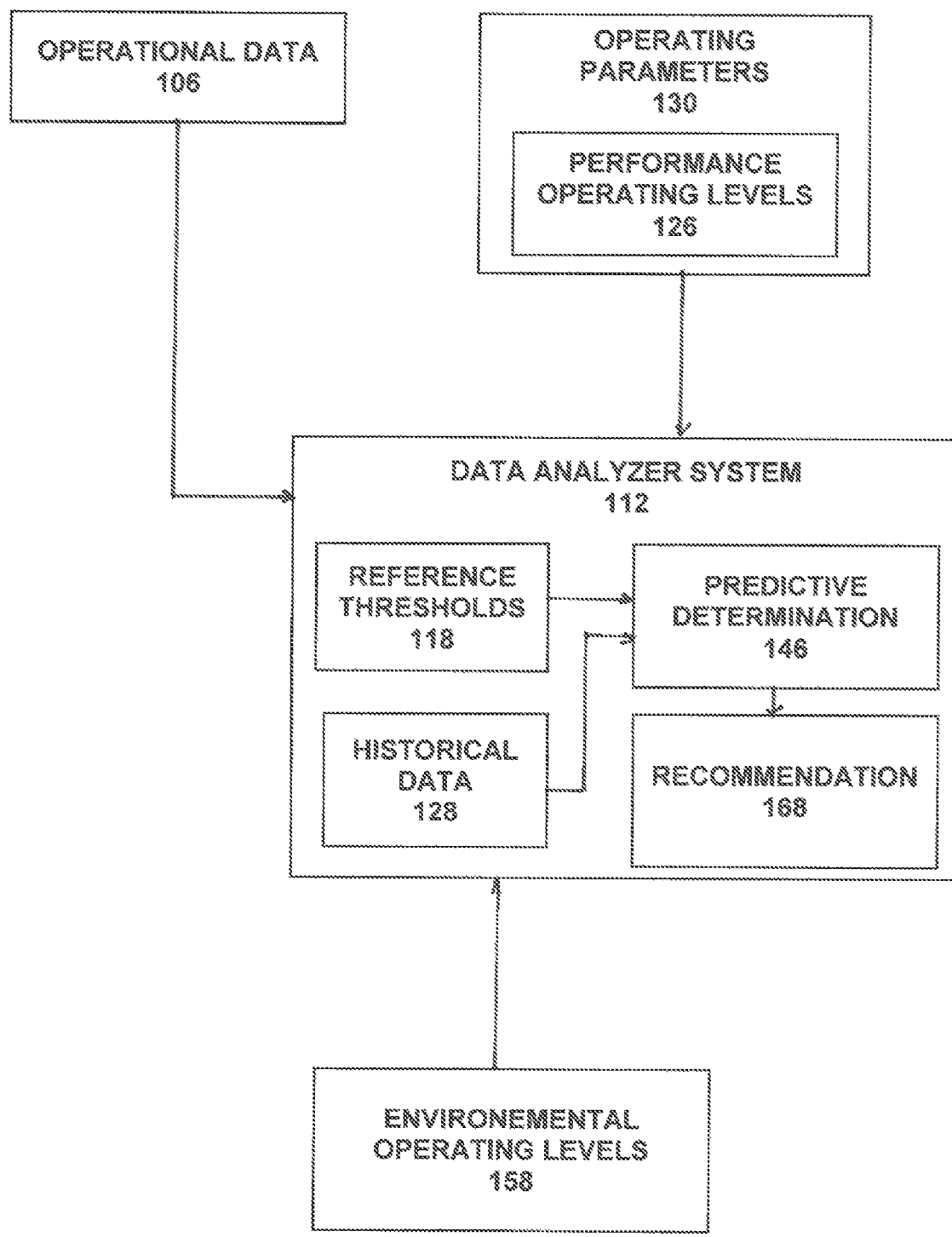
FIG. 9 is a schematic illustration showing operational data and operating parameters and environmental operating levels being transmitted to the data analyzer system.

In a preferred embodiment of the invention the real-time operational data 106 includes environmental operating levels 158 which are stored in the environmental data base 160. Changes occurring in the real-time operational data 106 can then be correlated with changes in the performance information 134 and changes in environmental operating levels 158. For example, as illustrated in FIG. 9, changes in the real-time operational data 106 and changes in performance operating levels 126 of operating parameters 130 are correlated by the data analyzer system 112 with changes in the environmental operating levels 158. It should be understood that environmental operating levels 158 (such as, but not limited to temperature levels, humidity levels, vibration levels, acoustic levels) that the machine is operating in, such as room or building conditions generally or proximate to the machine, can result in changes in the real-time operating data. In a non-limiting example, a change in an environmental operating level 158, such as the temperature a machine is operating in (such as room or location temperature) can result in a change in one or more operating parameters without indicating a need for maintenance. Accordingly, the analysis module operates to correlate such changes in the environmental operating levels, the performance operating levels of the machine and performing information and makes a predictive determination that the machine is operating properly or will fail after a determined amount of time (predictive time of failure determination). The analysis module further operates to maks a recommendation, such as to do nothing or to adjust the environment (changes the environmental operating levels) to prevent such failure or reduction in the performance of the machine. In a preferred embodiment of the invention, the data analyzer system 112 uses the environmental operating levels 158 in conjunction with historical data 128 to make a predictive determination 146 as to the effect of such changes in the environmental operating levels 158 and/or to make a recommendation 168. For a non-limiting exemplary illustration, changes in environmental operating levels, such as an increase in temperature levels or humility levels in or around a machine, may result in changes in the performance of the machine as determined by historical data that reflects the changes with the performance of a machine with changes in its operating environment. Such changes in environmental operating levels are correlated with changes in the performance operating levels of the machine which is then utilized by the data analyzer system to create or modify reference thresholds 118 to account for changes in the operating environmental expected to be experienced by the machine during operation.

Maintenance Scheduling

Figure 10:
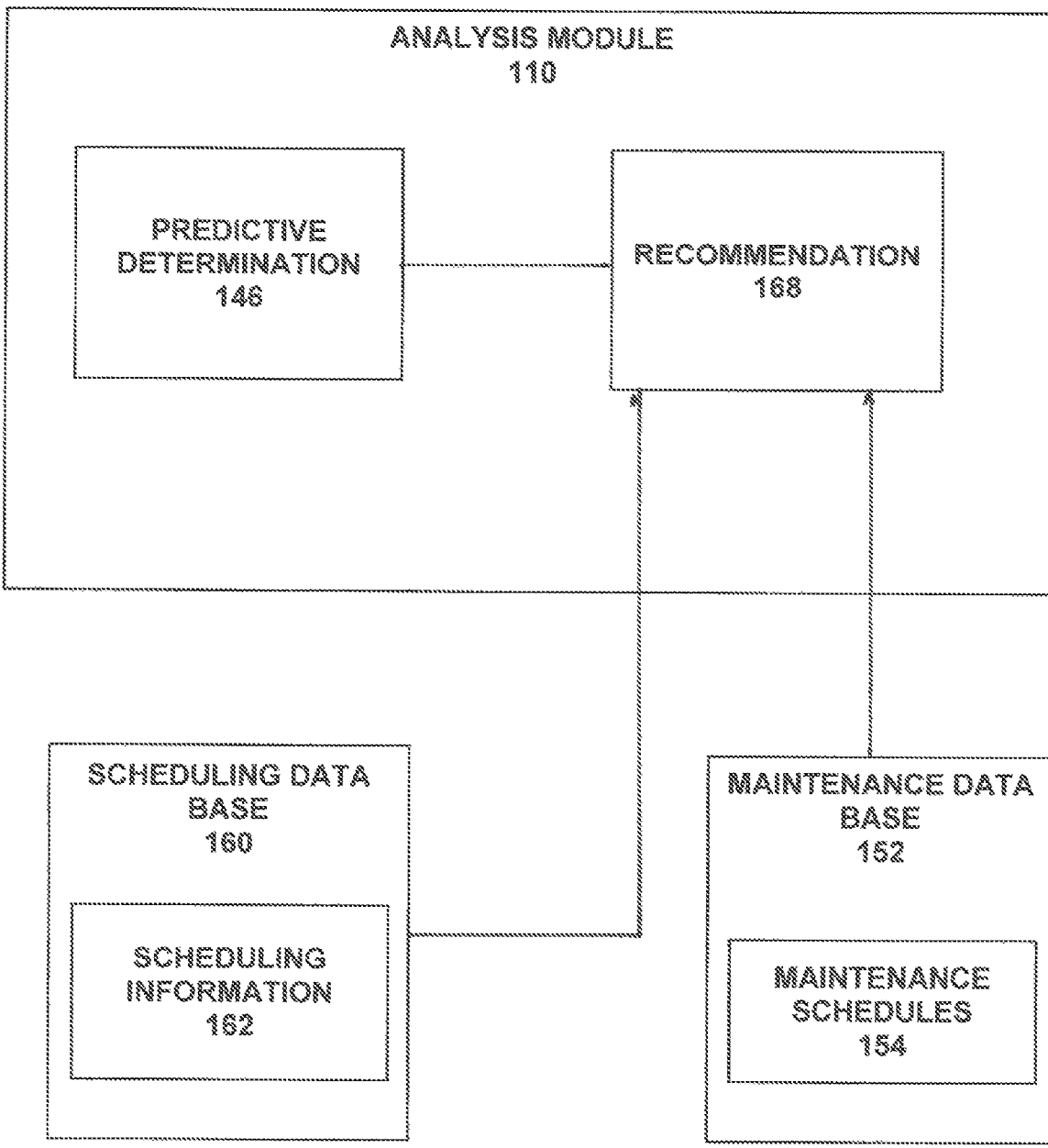
FIG. 10 is a schematic illustration showing scheduling data and maintenance schedules being transmitted to the analysis module.

In a preferred embodiment of the invention, the analysis module 110 operates to perform an analysis of current predictive determinations 146 made for all of the machines 10 functioning in an entire industrial operation 174 and makes a recommendation 168 for scheduling that provides an operator 12 with the most optimized time to perform maintenance. For example, the analysis module operates to make a mathematical analysis, such as a predictive analysis, using current predictive determinations and identifies which machine most requires maintenance (a critical machine) to prevent failure or operational errors occurring in the relative near future, such as in a predictive time of failure determination. Preferably, the predictive time of failure determination 148 of the critical machine 10 is scheduled to be operating, such as in a production cycle. Preferably, as illustrated in FIG. 10, the analysis module 110 uses maintenance schedules 154 stored in the maintenance data base 152 to determine if the critical machine 10 that is predicted to need maintenance first (according to the current predictive determinations 146, is expected to fail before another machine in the industrial operation 174) will operate until maintenance has been scheduled for that machine as indicated in the maintenance schedules 154. In that event, the recommendation 168 for scheduling would indicate that operations of the industrial operation 174 should continue until the time indicated in the maintenance schedule 154. The analysis module 110 will then operate to amend the maintenance schedules 154 for all of the machines 10 in the industrial operation 174. For a non-limiting example, all machines 10 that are predicted to require maintenance will have their maintenance schedule 154 amended such that maintenance is performed for such machines at the time the most critical machine is scheduled for maintenance or when the industrial operation is complete and before the next industrial operation is scheduled to begin.

In another preferred embodiment of the invention, the analysis module 110 of the data analyzer system 112 operates to perform an analysis of current predictive determinations 146 made for all of the machines 10 functioning in an entire industrial operation 174 and makes a recommendation 168 for scheduling that provides an operator 12 with the most optimal time to perform maintenance. For example, the analysis module operates to make a mathematical analysis, such as a predictive analysis, using the current predictive determinations and determines which machine most requires maintenance (critical machine) to prevent failure or operational errors occurring in the relative near future, such as in a predefined time period. Preferably, the analysis module 110 uses scheduling information 162 stored in the scheduling data base 160 to determine if the critical machine 10 that is predicted to need maintenance first (according to the current predictive determinations 146, is expected to fail before completion of the operation being performed by the industrial operation 174. In the event that the predictive determination 146 indicates that a machine will fail before completion of the industrial operation is completed, the analysis module 110 operates to check scheduling information 162 for other industrial operations 174 and if other industrial operations are available, the analysis module 110 then operates to make a recommendation 168 that the work being performed or to be performed by the industrial operation 174 should be transferred to another industrial operation 174. In another preferred embodiment of the invention, if the analysis module 110 operates to make a predictive determination 146 that a machine of an industrial operation may require maintenance before completion of work being performed by an industrial operation, the analysis module 110 operates to change or amend the maintenance schedules 154 for the machines in the industrial operation so that maintenance is performed prior to work being performed by the industrial operation thereby eliminating or reducing the likelihood of interruption in the industrial operation and work being produced that is not in compliance with work product specifications. In another preferred embodiment of the invention, the analysis module 110 operates to compare all of the maintenance schedules 154 and scheduling information 162 for all of the industrial operations performing similar work and makes a recommendation 168 as to which industrial operation should perform the work and which industrial operation should be scheduled for maintenance. In this way work output performance can be maximized while eliminating or reducing the likelihood of an industrial operation failing before the assigned work is completed thus reducing output performance. It should now be apparent that by monitoring the "health" of an entire industrial operation the optimal or necessary time to perform maintenance can be determined. Further, by utilizing the maintenance schedules and scheduling information, the analysis module can operate to assign maintenance scores indicating which machines require maintenance immediately and those that require no maintenance which can then be used to calculate the cumulative health of an industrial operation and to prioritize the maintenance of each industrial operation.

Maintenance Operation

Figure 11:
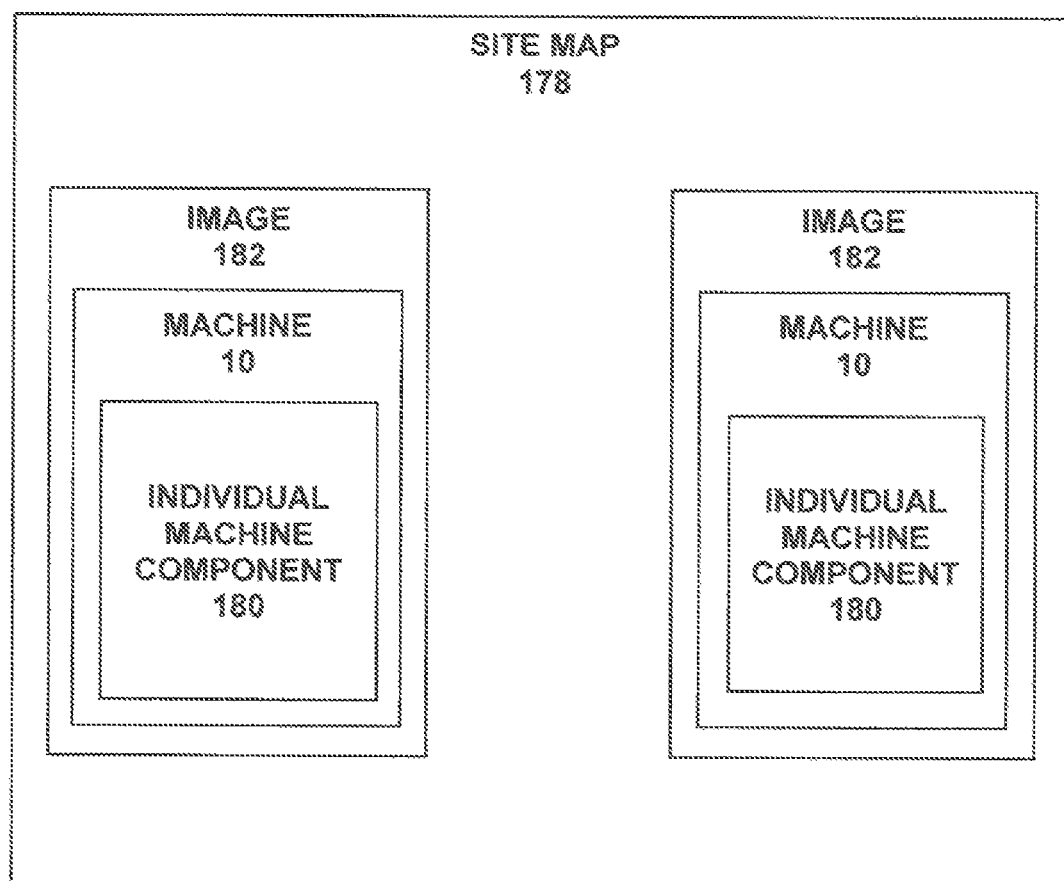
FIG. 11 is a schematic illustration showing a site map formed from two dimensional or three-dimensional images of machines.
Figure 12:
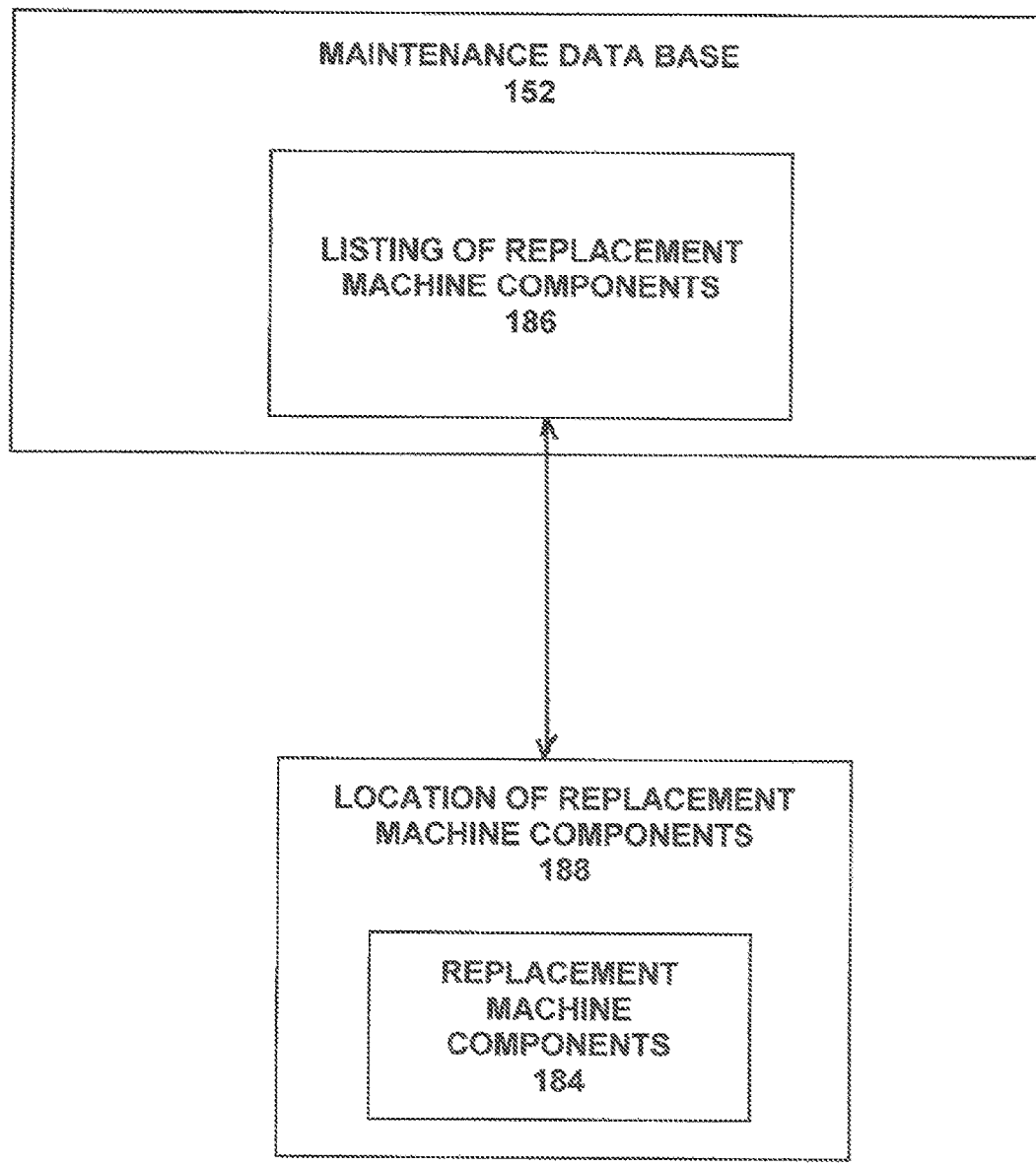
FIG. 12 is a schematic illustration illustrating a maintenance data base having a listing of replacement machine components and showing the location of the replacement machine components identified in the listing.

In a preferred embodiment of the invention, as illustrated in FIG. 11, industrial operations at a location, such as a plant or factory, are mapped to create a site map 178 and individual machines 10 are identified in the site map 178. Preferably, individual machine components 180 are also identified in the site map 178. In a preferred embodiment, the site map comprises a plurality of individual images 182, such as those collected by a drone or manually, to create a three-dimensional site map 178. The site map 178 can be created to provide a three-dimensional and/or a two-dimensional view of each machine. It in a preferred embodiment, when a machine or an individual machine component is scheduled for repair, the specific machine can be identified on the site map and the directions for an operator to use directing the operator to the specific machine, such as displayed on the operator's output device. Further, as illustrated in FIG. 12, individual machine components 180 can be identified with respect to each machine 10 and the history of each machine component 180 can be obtained such as through use of data stored in the maintenance data base 152 for the individual component 180. In a preferred embodiment the maintenance data base 152 includes a listing 186 of each machine component 180 and the number of replacement machine components 184 available and the location 188 of each replacement machine component 184. It should be understood that the listing 186 of all replacement machine components 184 listed at a facility where a machine is located but also replacement machine components 184 available at other locations. For a non-limiting illustration, if a specific machine component at a first facility is identified as needing maintenance in the near future, the data analyzer system operates to identify the location of a replacement machine component 184 that will be required and reserves the part for use to replace the specific machine component requiring maintenance. If the analyzer system operates to determine the needed replacement machine component is not at the location of the machine needing maintenance, the analyzer system operates, in compliance with any lead-time requirements, to order a replacement machine component from a part supplier or from another location prior to maintenance scheduling. In this way it should be apparent that replacement machine components are at the proper location at the proper time. It should also be understood that the analyzer system can also function to transmit automated orders to part suppliers when replacement machine components at a particular facility falls below a predefined amount. Thus, eliminating the risk that maintenance is postponed or an industrial operation is shut down waiting for replacement parts.

Figure 13:
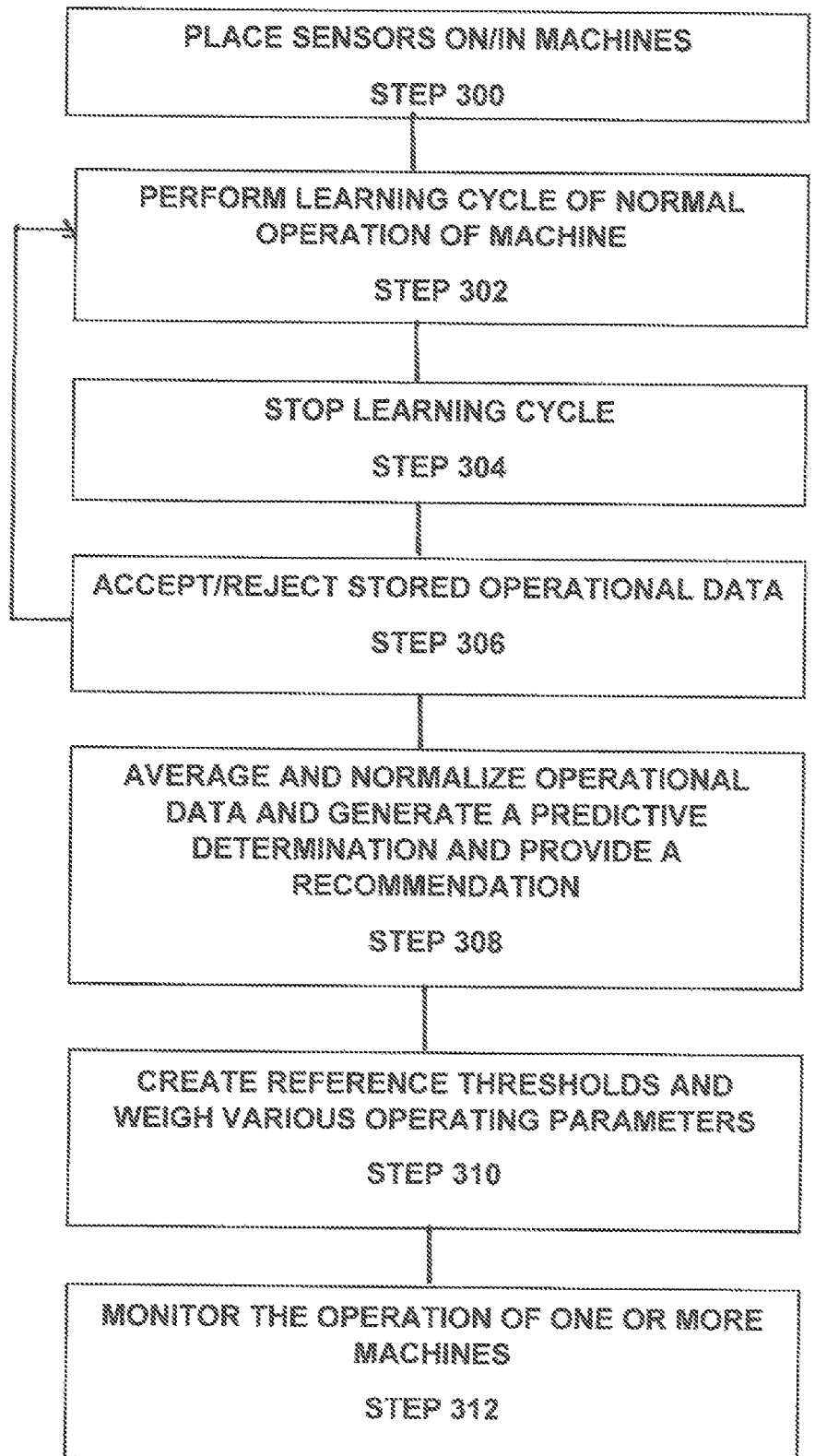
FIG. 13 is a schematic illustration of the methodology of the steps for using operational data to learn the normal operation of a machine and generating a predictive determination and reference thresholds.

It should now be apparent that the monitoring system of the subject invention operates to collect and analyze real-time operational information to access the overall health of a machine or a plurality of machines in an industrial operation using one or more of a variety of output devices including various mobile devices and one or more sensor arrays which together permits the monitoring system to utilize low voltage signals for receiving real-time operational data. In operation, the analysis module of the data analyzer system receives operational data during the normal operating state of a machine or industrial operation to "learn" the normal operation of the machine, such as the normal performance operating levels of various operating parameters, to create an operational baseline. In a preferred embodiment, as illustrated in FIG. 13, an operator places one or more sensors on or in critical areas of a machine or machines in an industrial operation (step 300). The operator then activates the data analyzer system to begin the learning the normal operating state of a machine, such as by use of "start" field displayed on the output device, to begin receiving operational data being collected from the one or more sensors and transmitted to the analysis module and stored in the operational data bank of the memory (step 302). Once the operator has determined that sufficient operational data has been received by the data analyzer system for creating an operational baseline for the machine, the operator can stop the learning process, such as by use of a "stop" field displayed in the output device (step 304). The operator can then accept or reject the stored operational data (step 306) or can manually adjust the operational data. Preferably, this action is repeated until the operator has determined that sufficient learning cycles (a complete performance cycle of a machine such as after the machine has completed a warm-up if required) has been obtained. Once the operator has determined that an acceptable number of learning cycles has been obtained, the analysis module operates to average and normalize the operational data and generates a predictive determination and preferably a recommendation as well (step 308). In a preferred embodiment, the analysis module further operates to create reference thresholds and gives weights to various operating parameters (tolerances that are deemed acceptable) (step 310) and further allows the operator to select reference thresholds in the form of ranges (such as "low," "medium" and "high ranges") depending on various factors, such as scheduling information and importance of the operation of a machine or industrial operation). It should be understood that the operator can also manually input reference tolerances using the output device. It should be understood that the monitoring system operates to monitor the operation of one or more machines in an industrial operation and the data analyzer system continuously uses the transmitted operational data to access the "health" (operating performance of the machine) and correlates the operational data with performance data thereby allowing the analysis module to adjust the operational baseline and/or the reference thresholds to account for daily fluctuations or minor mechanical oddities (step 312).

As described herein above, it should be understood that the monitoring system of the subject invention can be utilized for monitoring an industrial operation array for each of the one or more machines, wherein each said sensor array has one or more sensors placed in one or more locations on or within each machine that operates to collect operational data. Preferably, the monitoring system further has one or more performing sensors for collecting performing information, a data analyzer system having an analysis module, a statistical system and a memory and a communication system for transmitting the operational data and the performing information to the data analyzer system for storage in the memory. Further, the memory includes maintenance schedules for each machine. In operation, the analysis module functions to establish an operational baseline of each machine using the performance operating levels obtained during normal operating state of each machine and further functions to store the performance operating levels as historical data and uses the historical data to determine reference thresholds. The one or more sensors then operate to transmit real-time operational data through the communication system to the data analyzer system which operates to compare the real-time operational data to the operation baseline and then operates to make a predictive determination. During operation if the real-time operational data falls outside one or more of the reference thresholds, the data analyzer system operates to transmit a warning to an output device for informing an operator and further operates to compare the maintenance schedules and scheduling information for all the machines in the industrial operation and makes a recommendation as to when maintenance should be performed for the industrial operation. In another preferred embodiment the historical data includes operational specifications for each machine, performing information, and operation data collected from a plurality of similar or identical machines over a defined period of time.

It should now be apparent that the monitoring system of the subject invention operates to collect real-time operational data including performance operating levels of operating parameters and uses the collected data taken during the normal operating state to create historical data and uses the historical data ("learns") to determine a machine's operational baseline and reference thresholds. It should now be understood that the operational baseline allows a predictive determination as to when a machine may no longer be operating within a reference baseline (or in a preferred embodiment within operational specifications for the machine) based on various conditions, such as changes in environmental operating levels experienced by the machine during operation. Using historical data for the machine or for other similar machines, a predictive determination can be made for a machine which can then be used to make a recommendation for scheduling maintenance or determining the likelihood that a machine may fail before completion of an industrial operation. The monitoring system further operates to permit maintenance schedules for various machines in an industrial operation to be changed or amended so that maintenance is performed at the most optimized time while minimizing the likelihood of a machine failure during an industrial operation. Further, using the predictive determination, the monitoring system operates to make a recommendation as to scheduling which industrial operation should be used to perform an industrial operation that minimizes the likelihood of a malfunction or an interruption of the industrial operation. It should also now be apparent that as additional historical data is collected, the operational baseline for a machine as well as predictive determinations and recommendations will automatically be updated and will increasingly become more accurate as the monitoring system continues to learn how a machine operates under different environmental operating conditions and over operating times.

It should also now be apparent that the monitoring system of the subject invention operates to analyze one or more machines of an industrial operation and provides a structured methodology and design that is new and novel but is not limited to the specific design of the system. It should also be understood that monitoring system of the subject invention can also be used by an operator to monitor the status ("health") of a machine or an industrial operation. Fir an illustrative example, an operator using his output device can request the data analyzer system to transmit real-time operational data for display on the operator's output device real-time operation data, such as performance operating levels of one or more operating parameters, collected by a sensor array for a machine. In this way the operator can examine the performance operating levels manually to determine if a machine is operating properly (with reference thresholds). In this way, the operator can manually asses the condition ("health") or a machine or the machines in an industrial operation to determine if a machine or industrial operation is required.

Independently Operating Machines

Figure 14:
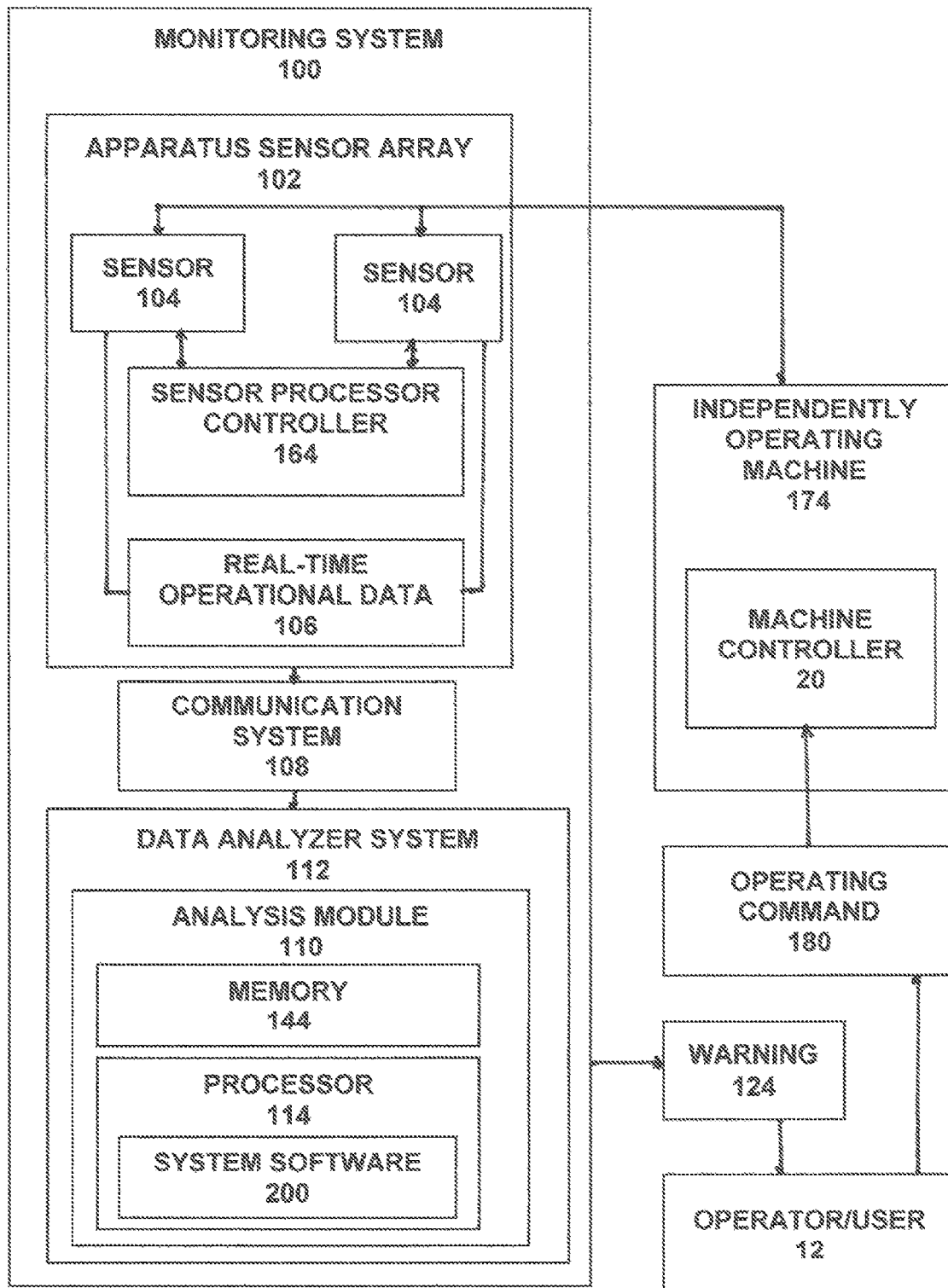
FIG. 14 is a schematic illustration of the methodology of another preferred embodiment of the invention whereby the monitoring system is utilized on independently operating machines for monitoring the operating state of the machine and whereby the independently operating machine includes a control system that communicates with and cooperates with the monitoring system for controlling the operation of the independently operating machine.

In another preferred embodiment of the invention the monitoring system is utilized on independently operating machines for monitoring the operating state of the machine. As illustrated in FIG. 14, the machine 10 is an independently operating machine. In a preferred embodiment of the invention the independently operating machine 10 includes a machine controller 20 that communicates with and cooperates with the monitoring system 100 for controlling the operation of the independently operating machine. The apparatus sensor array 102 of the monitoring system includes one or more sensors 104 that are placed in one or more locations on or within the machine 10 which function to collect operational data 106, a communication system 108 for transmitting the operational data 106 to an analysis module 110 of data analyzer system 112 having a processor 114 that operates to establish ("learn") the normal operating state of the machine and uses the collected operational data taken during the normal operating state of the machine to create an operational baseline 116 for a particular machine 10. It should be understood the independently operating machine can comprise a wide variety of machines or operating systems. Such independently operating machines include various household devices such as washers, dryers, heating and air conditioning devices, pumps, house-hold appliances, kitchen appliances, building structures, electrical systems, hot water systems, and the like. It should also be understood that such independently operating machine can also comprise vehicles, such as automobiles, trucks, tractors, farm equipment, aircrafts, water crafts, and the like. It should also be understood that as used herein an independently operating machine can further comprise structures and/or structures having mechanically and/or electrically operating devices. In a non-limiting exemplary illustration, a user attaches the sensor array having one or more sensors, such as a vibration sensor, onto an independently operating machine, such as an air conditional unit. The sensor operates to collect vibration operational data during the normal operating state of the air conditioner. Once sufficient amount of vibration operational data has been obtained and transmitted to the analysis module of the data analyzer system using the communication system, the data analyzer system creates an operational baseline of the operational levels of the vibration operating parameters and reference thresholds. The one or more sensors continuously operate to collect real-time operational data and compares the real-time operational data with the operational baseline and reference thresholds. In the event the vibrational operating parameters exceeds the reference thresholds, a warning 124 is transmitted to the user 12 such as using the user's output device 122. In a preferred embodiment, the user can then transmit an operating command 180 to the machine controller 20, such as to shut off or reduce the operation of the independent machine. It should be understood that as used herein the machine controller can be a controller that is incorporated into the machine design or is a machine controller, such as a conventional "smart plug," that connects the machine's power source, such as a wall socket, to the power cord of the machine and is in wireless communication with the analysis module, for receiving commands, such as a turn on command or a turn off command. In another non-limiting exemplary illustration, a user can attach one or more sensor arrays having one or more sensors on various components of a vehicle, such as an automobile. While automobiles often have various sensors for monitoring various components of the automobile, such as oil pressure sensors, radiator flow cooling sensors, fuel flow sensors, tire pressure sensors, etc. they generally do not include various vibration or acoustic sensors. Accordingly, a user of the monitoring system of the subject invention can attach various sensor arrays having one or more sensors, such as, but not limited to one or more vibration sensors or acoustic sensors located for example along an engine, transmission, differentials, etc. that collect operational data and transmits the data to the analysis module for creating an operation baseline for the component then monitors real-time operational data and sends a warning to the output device of the user in the event the real-time operational data exceeds or approaches a reference threshold thereby allowing a user to have the component inspected for maintenance needs prior to a component failure or before extensive damage occurs to the component.

It should now be apparent to one skilled in the art that the monitoring system of the subject invention can be utilized for a variety of applications from industrial operations to home use type applications. It should also be understood that the monitoring system of the subject invention permits a user to attach a sensor array having one or more sensors onto various types of machines (those used in industrial operations or independently operating machines) that collect performance operating levels of pertinent operating parameters) to develop an operational baseline of the normal operating state of the machine and monitors real-time operational data to detect if the machine begins to function improperly or experience a possible failure.

Although the foregoing invention has been described in some detail for purposes of clarity of understandings, it will be apparent that certain changes and modifications may be practiced within the scope of the appended claims. Accordingly, it should also now be apparent that the various embodiments presented can be easily modified while keeping within the scope and spirit of the subject invention. It should also be understood that the present disclosure is to be considered as exemplary of the principals of the invention and is not intended to limit the invention to the embodiments and the specific examples illustrated and the invention is not to be limited to the details given herein but may be modified within the scope and equivalents of the descriptions and examples contained herein.

The invention claimed is:

1. A monitoring system for monitoring an industrial operation having one or more machines, the monitoring system comprising:
   at least one sensor array, wherein each said at least one sensor array having one or more sensors placed in one or more locations on or within the one or more machines that operate to collect operational data, wherein said operational data includes performance operating levels for one or more operating parameters for at least one or more machines;
   a data analyzer system having a memory;
   a communication system for transmitting said operational data to said data analyzer system for storage in said memory;
   wherein said data analyzer system operates to use said collected operational data to save as historical data and uses said historical data to create an operational baseline for at least one of the one or more machines;
   wherein said one or more sensors then operate to collect real-time operational data for at least one of the one or more machines and said real-time operational data is transmitted through said communication system to said data analyzer system that operates to compare said real-time operational data to said operational baseline and if said comparison of said real-time operational data and said operational baseline falls outside one or more of said reference thresholds, said data analyzer system operates to determine if a machine is expected to fail before completion of work to be performed by the industrial operation, if so, said data analyzer system then operates to compare said maintenance schedules and scheduling information for other industrial operations to identify other industrial operations and/or machines that are available to perform work and makes a recommendation based on said comparison that work should be transferred to said identified machine or industrial operation and transmits said recommendation to an operator.

2. The monitoring system of claim 1, wherein said data analyzer system further operates to identify one or more machines in the industrial operation and makes a determination when each one or more machines is expected to fail and if said determination is that a machine will fail before completion of work, said data analyzer system using scheduling information and maintenance schedules for other industrial operations operates to determine if another industrial operation is available to perform work, said data analyzer system operates to make a recommendation that work should be transferred to said available industrial operation and transmits said recommendation to an operator and said data analyzer system further operates to amend maintenance schedules for all machines in the industrial operation having said identified one or more machines expected to fail before completion of work so that maintenance is performed prior any work being performed.

3. The monitoring system of claim 1, wherein said data analyzer system operates to create said reference thresholds by analyzing and correlating changes in performance levels for a machine that results in performance of the machine falling outside acceptable predefined operational specifications for the machine.

4. The monitoring system of claim 1, wherein said real-time operational data includes environmental operating levels and wherein said data analyzer system operates to correlate changes in performance information with changes in said environmental operating levels and uses said correlation to determine if the machine is operating properly or will fail after a determined amount of time.

5. The monitoring system of claim 4, wherein said data analyzer system further operates to make a recommendation for preventing failure of the machine or reduction in the performance of the machine and transmits said recommendation for preventing failure to an operator.

6. The monitoring system of claim 1, wherein said data analyzer system further operates to compare maintenance schedules and scheduling information for all machines in the industrial operation and in other industrial operations that will perform similar operations as the industrial operation and makes a recommendation when the industrial operation or one or more of the other industrial operations should be scheduled for maintenance and transmits the recommendation when the industrial operation or one or more of the other industrial operations should be scheduled for maintenance to an operator and further operates to create a prioritize listing for the industrial operation and the other industrial operations based on a predicted determination for each machine in the industrial operation and the other industrial operations and further operates to use said prioritize listing and scheduling information stored in said memory for the industrial operation and the other industrial operations to determine an optimum time for performing maintenance on machines in the industrial operation and the other industrial operations.

7. The monitoring system of claim 1, wherein said historical data further comprises operational data collected from a plurality of similar or identical machines over a defined period of time.

8. The monitoring system of claim 1, wherein said data analyzer system operates to monitor one or more industrial operations and determine which machines in said one or more industrial operations require maintenance and prioritizes the maintenance of the machines in the one or more industrial operations.

9. The monitoring system of claim 1, further comprising a site map having individual machines identified on said site map and wherein a machine that needs maintenance is identified on said site map.

10. A monitoring system for monitoring an industrial operation performing work and having a machine, the monitoring system comprising:
at least one sensor for the machine, wherein each said sensor operates to collect operational data;
a performance sensor for collecting performing information for the machine;
a data analyzer system having a memory; and
a communication system for transmitting said operational data and said performing information to said data analyzer system;
wherein said data analyzer system operates to establish an operational baseline for the machine using said performing information and operating levels taken during normal operation of the machine;
wherein said sensor further operates to obtain and transmit real-time operational data through said communication system to said data analyzer system which operates to compare said real-time operational data to said operational baseline and then operates to make a predictive determination;
wherein if said predictive determination is that the machine is expected to fail before completion of work, said data analyzer system then operates to compare maintenance schedules and scheduling information for other machines to identify other machines that are available to perform the work and transmits said predictive determination to an operator.

11. The monitoring system of claim 10, further comprising a site map identifying the location of a machine scheduled for maintenance and a listing of machine components and replacement machine components available near the location.

12. The monitoring system of claim 10, further comprising a listing of replacement machine components and wherein if said data analyzer system determines if the machine will need maintenance within a predetermined time, said data analyzer system operates to identify the location of needed replacement machine components using said listing of replacement machine components required to perform the maintenance and further operates to reserve said needed replacement machine components or if said needed replacement machine components are not at a desired location, said data analyzer system operates to order said needed replacement machine components from a part supplier or from another location prior to said maintenance schedule for the machine.

13. The monitoring system of claim 10, wherein said operational data includes operating parameters and wherein said operating parameters are weighted based on the significance of the said operating parameter to the operation of the machine for use in said predictive determination that the machine will fail within a predictive amount of time.

14. The monitoring system of claim 10, wherein said real-time operational data includes environmental operating levels and wherein said data analyzer system further operates to correlate changes in performance information with changes in said environmental operating levels to determine if the machine is operating properly or will fail after a determined amount of time.

15. The monitoring system of claim 10, wherein said prediction determination as to when each machine will require maintenance and wherein said data analyzer system operates to amend said maintenance schedule for the machine.

16. The monitoring system of claim 10, wherein said data analyzer system identifies the type of maintenance that should be performed on a machine.

\* \* \* \* \*